United States Patent [19]
Knudson

[11] Patent Number: 5,521,945
[45] Date of Patent: May 28, 1996

[54] REDUCED COMPLEXITY EPR4 POST-PROCESSOR FOR SAMPLED DATA DETECTION

[75] Inventor: Kelly J. Knudson, Mountain View, Calif.

[73] Assignee: Quantum Corporation, Milpitas, Calif.

[21] Appl. No.: 497,520

[22] Filed: Jun. 30, 1995

[51] Int. Cl.$^6$ ............................................. H03D 1/00
[52] U.S. Cl. ........................ 375/341; 375/263; 375/290; 371/43; 360/65
[58] Field of Search ........................ 375/290, 291, 375/340, 341, 263, 266; 360/46, 65; 364/602, 724.2; 371/43, 45

[56] References Cited

U.S. PATENT DOCUMENTS

| | | | |
|---|---|---|---|
| 5,341,387 | 8/1994 | Nguyen | 375/341 |
| 5,408,503 | 4/1995 | Kahlman | 375/340 |
| 5,430,468 | 7/1995 | Minuhin et al. | 375/340 |

OTHER PUBLICATIONS

Wood, Peterson, "Viterbi Detection of ClassIV Partial Response on a Magnetic Recording Channel," IEEE Tran. May 1986 pp. 454–461.

Knudson, Wolf and Milstein, "Dynamic Threshold Implementation of the Maximum Liklihood Detector for the EPR4 Channel", *IEEE GlobeCom '91 Conf. Record*, vol. 3, GlobeCom, Phoenix, AZ, Dec. 1991, pp. 60B.1.1–60B.1.5.

Knudson, Wolf and Milstein, "A Concatenated Decoding Scheme for (1–D) Partial Response With Matched Spectral-–Null Coding", *IEEE GlobeCom '93 Conf. Record*, Globe Com, Houston, Texas, Nov. 29–Dec. 2, 1993, pp. 1960–1964.

Wood, "Turbo–PRML: A Compromise EPRML Detector", *IEEE Transactions of Magnetics, vol. 29, No. 6, Nov. 1993*.

Forney, "The Viterbi Algorithm", *Proceedings of the IEEE*, vol. 61, No. 3, Mar. 1973, pp. 268–2278.

Forney, "Maximum–Liklihood Sequence Estimation of Digital Sequence in the Presence of Inteersymbol Interference", *IEEE Tranactions on Information Theory*, vol. IT–18, No. 3, May 1972.

U.S. patent application Ser. No. 08/497,182 filed Jun. 30, 1995, for: "A Rate 16/17 (d=0, G=6/I=7) Modulation Code for a Magnetic RecordingChannel".

*Primary Examiner*—Stephen Chin
*Assistant Examiner*—T. Ghebretinsae
*Attorney, Agent, or Firm*—David B. Harrison

[57] ABSTRACT

An EPR4 detector comprises a PR4 Viterbi detector and an EPR4 post-processor for improving estimated output sequence at an output of the PR4 Viterbi. The PR4 Viterbi detector produces digital estimates of coded digital information values into the channel in accordance with a path through a PR4 trellis and produces other path information relating to other paths through the PR4 trellis. The EPR4 post-processor has a PR4 path storage circuit for receiving and storing the estimated sequence of coded digital information values which corresponds to a PR4 path through a sequence of states of an EPR4 trellis; an error-event selection circuit for receiving the other path information from the PR4 Viterbi detector for generating non-overlapping error-events from a set of error-events deviating from the PR4 path through the EPR4 trellis stored in the PR4 path storage circuit, and a path correction circuit connected to the PR4 path storage circuit and to the error-event selection circuit for correcting non-overlapping error-events deviating from the PR4 path through the EPR4 trellis, and for putting out a corrected estimated sequence of coded digital information values. An EPR4 detection method is also disclosed.

26 Claims, 14 Drawing Sheets

REDUCED COMPLEXITY EPR4 POST-PROCESSOR FOR SAMPLED DATA DETECTION

SUMMARY OF THE INVENTION

The present invention relates to the detection of information within a sampled data detection chapel, such as a magnetic recording and playback channel. More particularly, the present invention relates to a reduced complexity post-processor for a binary input extended partial response class 4 (EPR4) channel.

BACKGROUND OF THE INVENTION

In order to achieve higher recording densities, designers of magnetic recording channels have switched from analog peak detection techniques to sampled data detection techniques. In sampled data detection systems, the readback signal is filtered and sampled at the channel rate of 1/T, where T is the duration of a channel symbol. One such technique is referred to as partial response maximum likelihood (PRML). The most common PRML system uses filters to equalize the readback signal to a partial response class 4 (PR4) signal. The discrete-time transfer function of a PR4 channel is $(1-D^2)$, where D represents a unit-time delay operator with unit-time T. Therefore, the noiseless output of the PR4 channel is equal to the input signal minus a version of the input signal delayed in time by 2T. In a PRML system, the output of the noisy partial response channel is sampled at the channel rate and detected using a Viterbi detector. Typically, the Viterbi detector is designed for maximum-likelihood detection of the sampled partial response channel in additive, independent, and identically distributed Gaussian noise with zero mean.

The PR4 $(1-D^2)$ channel is equivalent to bit-wise interleaving two $(1-D')$ channels, each operating at one-half of the channel rate, such that D' is a unit-time delay operator with unit-time 2T, i.e., $D'=D^2$. Since a Viterbi detector for the $(1-D')$ channel has a low complexity implementation, a Viterbi detector for the PR4 channel is frequently implemented by interleaving two Viterbi detectors for $(1-D')$ channels. With this implementation, the PR4 Viterbi detector operates at one-half of the channel rate enabling the channel rate to increase significantly before running into technical difficulties implementing high speed electronics within a very large scale integrated (VLSI) circuit. An example of a PR4 Viterbi detector employing two interleaved $(1-D')$ Viterbi detectors may be found in commonly assigned Nguyen U.S. Pat. No. 5,341,387 for Viterbi Detector for PRML Class IV in Disk Drive, the disclosure thereof being incorporated herein by reference.

Recently, there has been interest in sampled data detection techniques for magnetic recording with better performance than partial response class 4 with maximum-likelihood detection (PR4ML). Since the noise on the magnetic recording channel is colored by the filter used to equalize the signal to a partial response signal, the noise corrupting the sampled output of the partial response channel is more accurately described as additive, correlated Gaussian noise. Typically, the noise correlation degrades performance when a Viterbi detector that ignores the noise correlation is used. However, including the effect of noise correlation in the Viterbi detector is rarely done since this greatly increases the complexity. The degradation due to noise correlation can be minimized by selecting a partial response channel that more closely matches the frequency response of the magnetic recording channel.

At normalized recording densities above two channel symbols per pulse width at half-maximum, PW50/T>2.0, the frequency response of the magnetic recording channel resembles the frequency response of an EPR4 channel more closely than a PR4 channel. The extended parital response class 4 (EPR4) channel, with discrete-time transfer function $(1+D-D^2-D^3)$, has more low frequency and less high frequency content than the PR4 channel. Extended partial response class 4 with maximum-likelihood detection (EPR4ML) yields better performance at the higher recording densities, since equalizing a magnetic recording channel to an EPR4 channel response results in less high frequency noise enhancement. However, unlike the PR4 Viterbi detector described above, the EPR4 Viterbi detector can not be separated into two independent, interleaved, low complexity detectors running at one-half of the channel rate. As a consequence, the main drawback to implementing EPR4ML within a magnetic recording system has heretofore been that the EPR4 Viterbi detector is much more complex than a PR4 Viterbi detector, and has been practically realized only at considerably greater expense.

At sample time n, corresponding to time nT, the input symbol is x[n] and the noiseless output of the EPR4 channel is given by $y_{EPR4}[n]=x[n]+x[n-1]-x[n-2]-x[n-3]$. Since the input symbols are binary, there are five possible channel output symbols, which are −2, −1, 0, 1, and 2. The channel output symbols are also referred to as the noiseless EPR4 samples or the ideal EPR4 samples. The EPR4 channel has eight states corresponding to the eight possible values of the last three binary input symbols, $s[n]=\{x[n-3], x[n-2], x[n-1]\}$. The state transition diagram for the EPR4 channel shows the channel output symbol and the next state associated with all possible combinations of the binary input symbol and the state. The trellis diagram is obtained by adding a time axis to the state transition diagram. Each depth of the trellis represents one channel rate clock period. At the beginning of the clock period n, the EPR4 channel can be in any one of eight possible states. Given a particular state, there are two possible next states depending on the value of the binary input symbol. The paths through the trellis represent all possible binary input sequences.

The standard approach to implementing a Viterbi detector is to use the Viterbi algorithm to minimize the squared Euclidean distance between the sequence of noisy samples and all possible sequences of noiseless samples. The Viterbi algorithm is an iterative algorithm for determining the minimum metric path through a trellis, where the metric in this case is the squared Euclidean distance. During each clock cycle, an EPR4 Viterbi detector updates eight state metrics and selects one survivor path for each of the eight states. The survivor path represents the minimum metric path leading to a particular state, and the state metric represents the metric associated with that survivor path. In order to update the eight state metrics, the detector extends the survivor paths to obtain two paths to each state in the next trellis depth. A path metric is obtained by adding a state metric to a branch metric, where the branch metric represents the squared Euclidean distance between the current noisy sample and the noiseless sample associated with the branch. The paths metric associated with the two paths entering each state are compared and the minimum metric path is selected as the survivor path and the path metric for this path is selected as the new state metric. During each clock cycle, sixteen path metrics are calculated and eight comparisons are performed.

If it is not possible to perform the serial operations required to update the state metrics at the desired channel rate with the current VLSI technology, then the Viterbi algorithm can be implemented at one-half the channel rate using an eight state trellis with four branches entering each state. In this case, each trellis depth represents two channel rate clock cycles. Although the clock period doubles with this approach, the total number of operations more than doubles. Therefore, there is a significant implementation cost associated with increasing the channel rate.

Another approach to implementing an EPR4 Viterbi detector follows a difference metric implementation as described in e.g. Knudson, Wolf and Milstein, "Dynamic Threshold Implementation of the Maximum-Likelihood Detector for the EPR4 Channel", *IEEE GlobeCom'91 Conf. Record*, Vol. 3, GlobeCom, Phoenix, Ariz., December 1991, pp. 60B.1.1–60B.1.5. The difference metric is defined as the difference between the two path metrics entering a particular state. The sign of the difference metric is equalivalent to a comparison of the two path metrics. In this approach, eight difference metrics are updated during each clock cycle. Unfortunately, the difference metric implementation is only slightly less complex than the standard state metric implementation of an EPR4 Viterbi detector.

One way of reducing the complexity of an EPR4 Viterbi detector is to use decision feedback to subtract out the last trailing interfering symbol. Using this approach, the number of states in the trellis reduces to four corresponding to the two remaining interfering symbols. The EPR4 equalized samples are detected using a four-state trellis with local decision feedback to subtract out the last interfering symbol. Unfortunately, this decision feedback approach for EPR4 has degraded performance, since the last interfering symbol contributes a significant amount to the energy in the channel response. As a result, this decision feedback approach does not yield significantly better results than obtainable from a PR4ML detection channel. In general, the decision feedback approach is better suited to equalizer targets with less energy contribution from the trailing interfering symbols that are feedback.

Another implementation approach is to use a PR4 Viterbi detector, followed by a post-processor for EPR4. A post-processor for an EPR4 channel that achieves nearly maximum-likelihood performance was described by Wood, "Turbo PRML: A Compromise EPRML Detector", *IEEE Trans. on Magnetics*, Vol. 29, No. 6, November 1993, pp. 4018–4020. In the Turbo PRML post-processor technique, PR4 equalized samples are sent to a PR4 Viterbi detector that produces a preliminary estimate of the binary input sequence. Then, the preliminary estimate is sent to the post-processor to produce a final improved estimate of the binary input sequence.

The post-processor improves the preliminary estimate by correcting non-overlapping minimum distance error-events. Since the post-processor uses the same metric as an EPR4 Viterbi detector, the criterion used to correct minimum distance error-events is the same criterion used in an EPR4 Viterbi detector to select survivor paths. The post-processor approach uses the preliminary estimate from the PR4 Viterbi detector to indicate a path through the eight-state EPR4 trellis, which will be referred to as the PR4 path. At each state along the PR4 path, the post-processor calculates error-event metrics for all possible minimum distance error-events ending at this particular state. The error-event metric is related to the difference between the path metrics for the PR4 path and a contender path that diverges from the PR4 path and remerges for the first time at this particular state.

The contender paths are chosen such that the PR4 path and the contender paths are separated by the minimum distance, which means that the squared Euclidean distance between the noiseless signals on the two paths is the smallest possible value between any two paths in the EPR4 trellis. The noise on the PR4 channel may cause the PR4 Viterbi detector detector to make an error when selecting the PR4 path. Since an EPR4 channel has less noise enhancement, the post-processor can correct this error by selecting a contender path over the PR4 path. Assuming that only minimum distance error-events occur and that the error-events are separated by at least the distance of the longest minimum distance error-event, then the output of the EPR4 post-processor is equal to the output of an EPR4 Viterbi detector.

If the path metric for a particular contender path is smaller than the path metric for the PR4 path, then that contender path qualifies as a possible error-event, since an EPR4 Viterbi detector would have selected the contender path over the PR4 path. After all the error-event metrics are calculated, compared, and qualified, the most likely error-event ending at the current state is selected. In order to avoid correcting error-events which overlap, the post-processor keeps track of the most-likely error event ending at any of the states within a window of time prior to the current time, where the length of the window is equal to the maximum length of a minimum distance error-event. If the most likely error-event ending at the current state is more likely than the best error-event stored in the window, then the best error-event in the window is updated to correspond to the error-event ending at the current state. The best error-event in the window is corrected only when it corresponds to an error-event ending at the oldest state in the window.

There are two distinct types of minimum distance error-events in the EPR4 trellis, which we will refer to as "type A" and "type B". For a rate 8/9 (d=0, G=4/I=4) modulation code, there are nine possible minimum distance error-events ending at a particular state: four are "type A" and five are "type B". For this code, the write current following the $1/(1 \oplus D^2)$ precoder satisfies the following conditions. The interleave constraint on the input to the precoder, I=4, implies that there are at most five consecutive 1's or 0's in the even or odd interleaved write current sequences, i.e., the substrings 1×1×1×1×1×1 and 0×0×0×0×0×0, where x indicates don't care, are not allowed in the write current sequence. The global constraint at the input to the precoder, G=4, implies that there are at most six consecutive 1's, 0's, or alternating 0's and 1's in the global write current sequence, i.e., the substrings 1111111, 0000000, 1010101, and 0101010 are not allowed. For this code, the four "type A" error-events correspond to mistaking the following write current sequences:

| | |
|---|---|
| 101 and | 010 |
| 1010 and | 0101 |
| 10101 and | 01010 |
| 101010 and | 010101. |

The five "type B" error-events correspond to mistaking the following write current sequences:

| | |
|---|---|
| 1 and | 0 |
| 1 × 1 and | 0 × 0 |
| 1 × 1 × 1 and | 0 × 0 × 0 |
| 1 × 1 × 1 × 1 and | 0 × 0 × 0 × 0 |
| 1 × 1 × 1 × 1 × 1 and | 0 × 0 × 0 × 0 × 0. |

For the rate 8/9 (0,4/4) modulation code, the Turbo PRML post-processor consists of 6 adders and 10 comparators. This circuitry is in addition to the PR4 Viterbi detector, which consists of 4 adders and 4 comparators. The total required circuitry necessarily includes 10 adders and 14 comparators. For comparison, an EPR4 Viterbi detector requires 14 adders and 8 comparators. Since the Turbo PRML post-processor described in the Wood article is even more complex than a conventional EPR4 Viterbi detector, there is little cost benefit to using the post-processor described in that article.

However, the main benefit to the post-processing approach is that the feedback path associated with the updating process in the Viterbi detector is eliminated, allowing for more pipelining and higher channel rates. Furthermore, the Turbo PRML post-processor can be modified to operate at even faster channel rates by using a half-rate clock and considering all the minimum distance error-events ending at two consecutive states during a half-rate clock period. For the rate 8/9 (0,4/4) code, the Turbo PRML post-processor requires 10 adders and 18 comparators when operating at one-half the channel rate. Including the PR4 Viterbi detector, the total number of operations is 14 adders and 22 comparators.

The post-processing approach is well-suited for high data rate applications by offering a reasonable trade-off between speed and complexity. In order to further increase the data rate, a higher rate modulation code with larger global and interleave constraints can be used. However, the looser constraints lead to an increase in the number of possible error-events. Since the Turbo PRML post-processor has hardware dedicated to calculating the error-event metric for each possible minimum distance error-event, this further increases the number of operations in the Turbo PRML post-processor.

A reduced complexity EPR4 post-processor referred to as simplified partial error response detection (SPERD) was presented by Yamakawa and Nishiya in a poster session at the INTERMAC conference in June of 1994. They simply reduced the complexity of the Turbo PRML post-processor by considering only two type B error-events ending at each state along the PR4 path. Since short error-events are more likely than long error-events, this approach considers only the two shortest minimum distance error-events which correspond to making one or two symbol errors. The SPERD approach can only lead to good performance when the probability of an error-event that is not one of the two considered is very small. One drawback to this approach is that the probabilities of longer error-events increase when modulation codes with looser constraints than the rate 8/9 (0,4/4) code are used. Therefore, the SPERD approach potentially compromises performance for a significant reduction in complexity.

Thus, a heretofore unsolved need has been for a reduced complexity EPR4 post-processor that does not significantly compromise performance compared to an EPR4 Viterbi detector.

SUMMARY OF THE INVENTION WITH OBJECTS

One object of the present invention is to realize a reduced complexity post-processor for an EPR4 channel which requires significantly fewer computations without sacrificing performance in a manner overcoming limitations and drawbacks of the prior art.

Another object of the present invention is to provide a reduced complexity post-processor for an EPR4 channel which utilizes calculations already performed in the PR4 Viterbi detector to reduce the number of calculations required in the post-processor thereby overcoming limitations and drawbacks of the prior art.

Another object of the present invention is to provide a reduced-complexity post-processor for an EPR4 channel which requires only seven adders and two comparators, independent of the modulation code constraints. The overall implementation of the EPR4 detector including the PR4 Viterbi detector and the post-processor requires only 11 adders and 6 comparators, thereby realizing a savings in complexity of approximately 23 percent over a traditional state metric implementation of the EPR4 Viterbi detector.

One more object of the present invention is to provide a reduced complexity post-processor for an EPR4 channel which can operate at one-half of the channel rate with 12 adders and 4 comparators. The overall implementation of the EPR4 detector including the PR4 Viterbi detector and the post-processor requires only 16 adders and 8 comparators, which is comparable to the complexity of a full-rate EPR4 Viterbi detector. However, the present invention runs twice as fast.

The present invention is realized within a detector for a sampled data detection channel which includes:

a PR4 Viterbi detector implemented with two interleaved (1–D') Viterbi detectors, where:

the input to the even (1–D') Viterbi detector is the sampled output of a PR4 equalized channel at even sampling times, and the input to the odd (1–D') Viterbi detector is the sampled output of a PR4 equalized channel at odd sampling times, and the output of the even (1–D') Viterbi detector includes the estimated binary input sequence associated with the even interleave, as well as binary merge symbols indicating diverging survivor paths in the even (1–D') Viterbi detector, and the output of the odd (1–D') Viterbi detector includes the estimated binary input sequence associated with the odd interleave, as well as binary merge symbols indicating diverging survivor paths in the odd (1–D') Viterbi detector, and a post-processor connected to the PR4 Viterbi detector and to the sampled output of a PR4 equalized channel that is comprised of:

a circuit for calculating and comparing error-event metrics for the "best type A" and the "best type B" minimum distance error-event ending at a particular state, where the "best type A" and "best type B" error-events are determined by the output of the PR4 Viterbi detector, and a circuit for correcting the "best" minimum distance error-event seen over a window of time equal to the length of the longest minimum distance error-event.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 8 is to be read and studied in conjuction with FIG. 6 to provide a complete block diagram of the post-processor.

FIG. 15A is to be read and studied in conjunction with FIG. 15B.

DETAILED DESCRIPTION OF A PREFERRED EMBODIMENT

Figure 1:
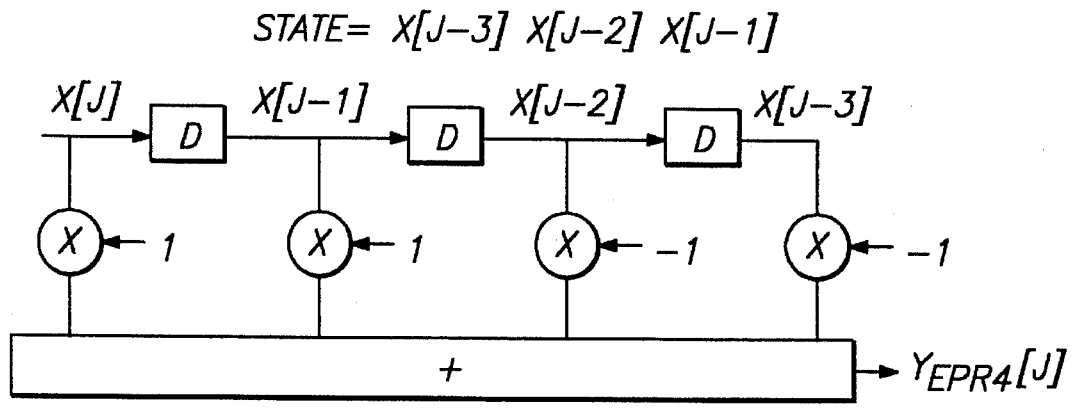
FIG. 1 is a diagram representing a discrete-time model of an EPR4 channel.
Figure 2:
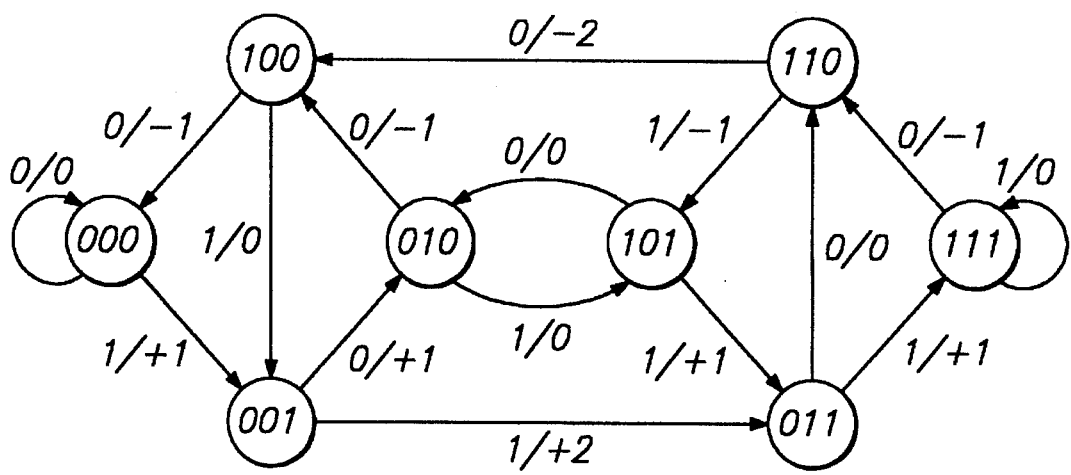
FIG. 2 is a state diagram of the eight state EPR4 channel.

The EPR4 channel has a discrete-time transfer polynomial $(1+D-D^2-D^3)$. At time j, the binary input to the channel is $x[j]$ and the state of the EPR4 channel is $s[j]=\{x[j-3], x[j-2], x[j-1]\}$. The output of the EPR4 channel is given by $y_{EPR4}[j]=x[j]+x[j-1]-x[j-2]-x[j-3]$. FIG. 1 illustrates a discrete time model of the EPR4 channel. FIG. 2 depicts an eight-state diagram for an EPR4 channel, where the labels on the branches indicate the binary input symbol followed by the channel output symbol.

Figure 3:
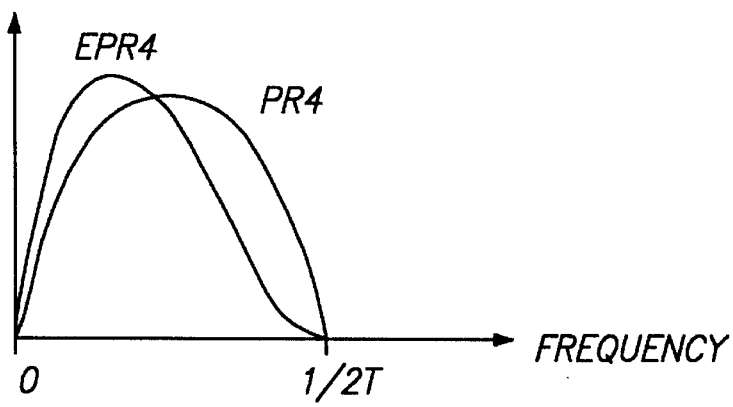
FIG. 3 is a plot comparing the magnitude of the frequency responses for the EPR4 channel and the PR4 channel.

The EPR4 transfer polynomial $(1+D-D^2-D^3)$ can be expressed as $(1-D)(1+D)^2$, where the $(1-D)$ factor indicates that the channel has a spectral null at DC and the two $(1+D)$ factors indicate that the channel has a second order spectral null at the Nyquist frequency, $1/(2T)$. The PR4 transfer polynomial $(1-D^2)=(1-D)(1+D)$ indicates that the PR4 channel has first-order spectral nulls at DC and the Nyquist frequency. As shown in FIG. 3, the EPR4 channel has less high frequency response then the PR4 channel, due to the faster fall off rate of the second-order spectral null.

Figure 4:
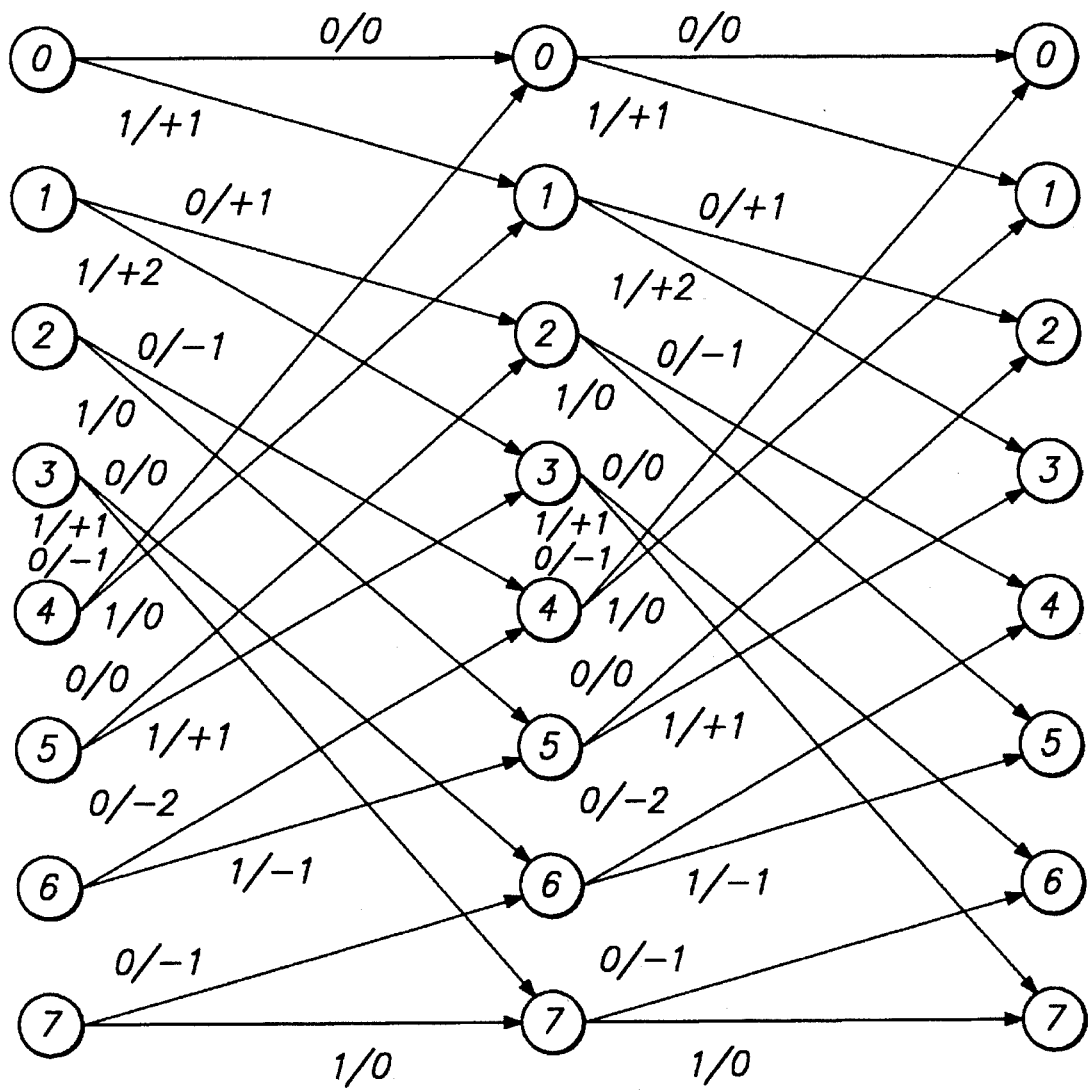
FIG. 4 is a trellis diagram of the eight state EPR4 channel.

Two depths of the eight-state EPR4 trellis are shown in FIG. 4. The trellis diagram is obtained from the state diagram in FIG. 2 by the addition of a time axis. Typically, an EPR4 Viterbi detector is designed to find the path through the EPR4 trellis that minimizes the squared Euclidean distance between the received samples and the ideal EPR4 samples along the path. The output of the EPR4 Viterbi detector is a maximum likelihood sequence estimate for an EPR4 channel corrupted by independent and identically distributed Gaussian noise with zero mean. The Viterbi algorithm is an iterative process of keeping track of the path with the smallest accumulated metric leading to each state in the trellis. The metrics of all of the paths leading into a particular state are calculated and compared. Then, the path with the smallest metric is selected as the survivor path. In this manner all paths which can not be part of the minimum metric path through the trellis are systematically eliminated. The survivor path to each state is stored in a path memory. Given that the path memory is sufficiently long, all of the survivor paths will diverge from a single path within the span of the path memory. The single path from which all the current survivor paths diverge is the minimum metric path. The input sequence associated with this path appears at the output of the Viterbi detector.

The squared Euclidean distance between two noiseless paths is equal to the sum of the squares of the differences between the ideal sample values on the two paths. The minimum squared Euclidean distance, $d_{min}^2$, between any two noiseless paths that diverge and remerge in the EPR4 trellis is equal to 4. In the case of independent and identically distributed Gaussian noise, the most-likely errors made in the Viterbi detector correspond to mistaking two sequences that are separated by the minimum distance. As a consequence, the minimum square Euclidean distance can be used to estimate the probability of error at the output of the Viterbi detector.

Figure 5:
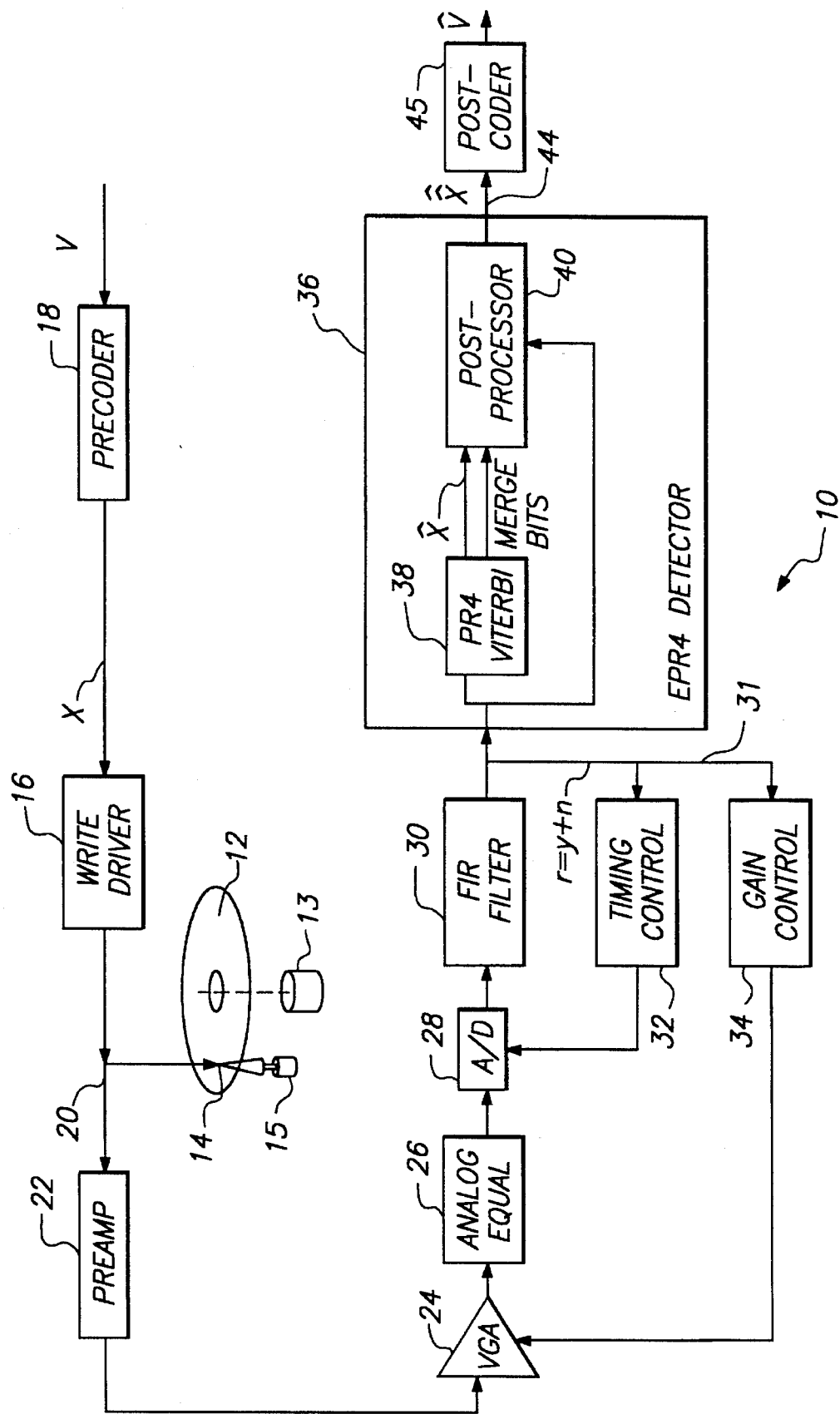
FIG. 5 is an overall system block diagram of a magnetic recording channel with an EPR4 detector incorporating the principles and aspects of the present invention.

Referring now to FIG. 5, a partial response, sampling data detection magnetic recording and playback channel 10 includes, e.g. a rotating magnetic data storage disk 12 which is rotated by a motor 13, and a head 14, positioned e.g. by a rotary voice coil actuator 15 operating within a closed loop servo (not shown) comprising a slider and a transducer for writing to selected data positions within concentric data tracks defined on the disk 12, and for reading information back from the disk 12. The information to be written (v) is precoded within a precoder circuit 18 in accordance with a predetermined modulation code to produce an encoded sequence (x) that is supplied to a write driver circuit 16. The write driver circuit 16 applies the write current corresponding to the coded information to the head 14. The digital information is recorded onto a selected concentric data track defined on a storage surface of the disk 12 in accordance with well-known magnetic saturation recording techniques and head positioning techniques.

In playback, magnetic flux transitions are induced in a read element of the head 14 and supplied over a path 20 to a read preamplifier 22. A voltage controlled gain amplifier (VGA) 24 controllably amplifies the playback signal, and an analog equalizer 26 may be included to provide some (or all) of the equalization to the gain-normalized playback signal. An analog/digital (A/D) converter 28 then samples the playback signal at the channel rate to provide discrete-time samples of the playback signal. A discrete-time finite impulse response (FIR) filter 30 may then receive and further equalize the samples to a predetermined spectrum. In the present example of the channel 10, the FIR filter 30 equalizes the samples to a PR4 spectrum. The PR4 equalized spectrum is then applied to control a liming control loop 32 which sets the rate and phase of the sampling within the A/D converter 28, and to a gain control loop which controls the VGA 24 to provide normalized gain. The PR4 equalized samples are also supplied to a detector 36 which is implemented and used in accordance with principles of the present invention. An example of a conventional PR4 sampled data detection channel is described in commonly assigned U.S. Pat. No. 5,341,249 entitled: "Disk Drive Using PRML Sampling Data Detection With Digital Adaptive Equalization", the disclosure thereof being incorporated herein by reference.

As shown in FIG. 5, the EPR4 detector 36 includes a PR4 Viterbi detector 38 and a post-processor 40. The continuous time magnetic recording channel is equalized to a PR4 signal and sampled at the channel rate. Assuming that the noise on a magnetic recording channel 10 is additive, the received sample at time j, denoted by $r_{PR4}[j]$, is the sum of an ideal noiseless sample, $y_{PR4}[j]=x[j]-x[j-2]$, and a noise sample, $n_{PR4}[j]$. Given a sequence of received samples, a Viterbi detector is used to estimate the recorded sequence of input symbols $\{x[0], x[1], \ldots, x[j], \ldots\}$. The PR4 Viterbi detector uses an iterative algorithm for finding the ideal output sequence closest to the received sequence at the output of the sample PR4 channel, in terms of the squared Euclidean distance. The estimated output sequence that minimizes the squared Euclidean distance, denoted by $\{\hat{y}_{PR4}[0], \hat{y}_{PR4}[1], \ldots, \hat{y}_{PR4}[j], \ldots\}$, specifies the estimated input sequence, denoted by $\{\hat{x}[0], \hat{x}[1], \ldots, \hat{x}[j], \ldots\}$. The post-processor is designed to emulate an EPR4 Viterbi detector, given the output of the PR4 Viterbi detector and the sampled output of the PR4 channel. From the PR4 equalized samples, the post-processor can determine the EPR4 equalized samples, since $r_{EPR4}[j]=r_{PR4}[j]+r_{PR4}[j+1]$. The post-processor 40 uses the estimated binary input sequence at the PR4 Viterbi detector output to establish a PR4 path through the EPR4 trellis. The objective of an EPR4 post-processor is to find the path through the EPR4 trellis that minimizes the squared Euclidean distance between the EPR4 equalized samples and the noiseless EPR4 samples, given that this path is restricted to the set of paths that deviate from the PR4 path by a sequence of non-overlapping minimum distance error-events. If the post-processor achieves this objective, then the estimated input sequence at the output of the post-processor, denoted by $\{\hat{\hat{x}}[0], \hat{\hat{x}}[1], \ldots, \hat{\hat{x}}[j], \ldots\}$, is equal to the output of an EPR4 Viterbi detector under the conditions that only minimum distance error-events occurred and that these error-events were sufficiently far apart. The post-processor 40 produces a sequence estimate ($\hat{\hat{x}}44$ in FIG. 5) which is "nearly" a maximum likelihood sequence estimate for an EPR4 channel corrupted by independent and identically distributed Gaussian noise with zero mean.

Figure 6:
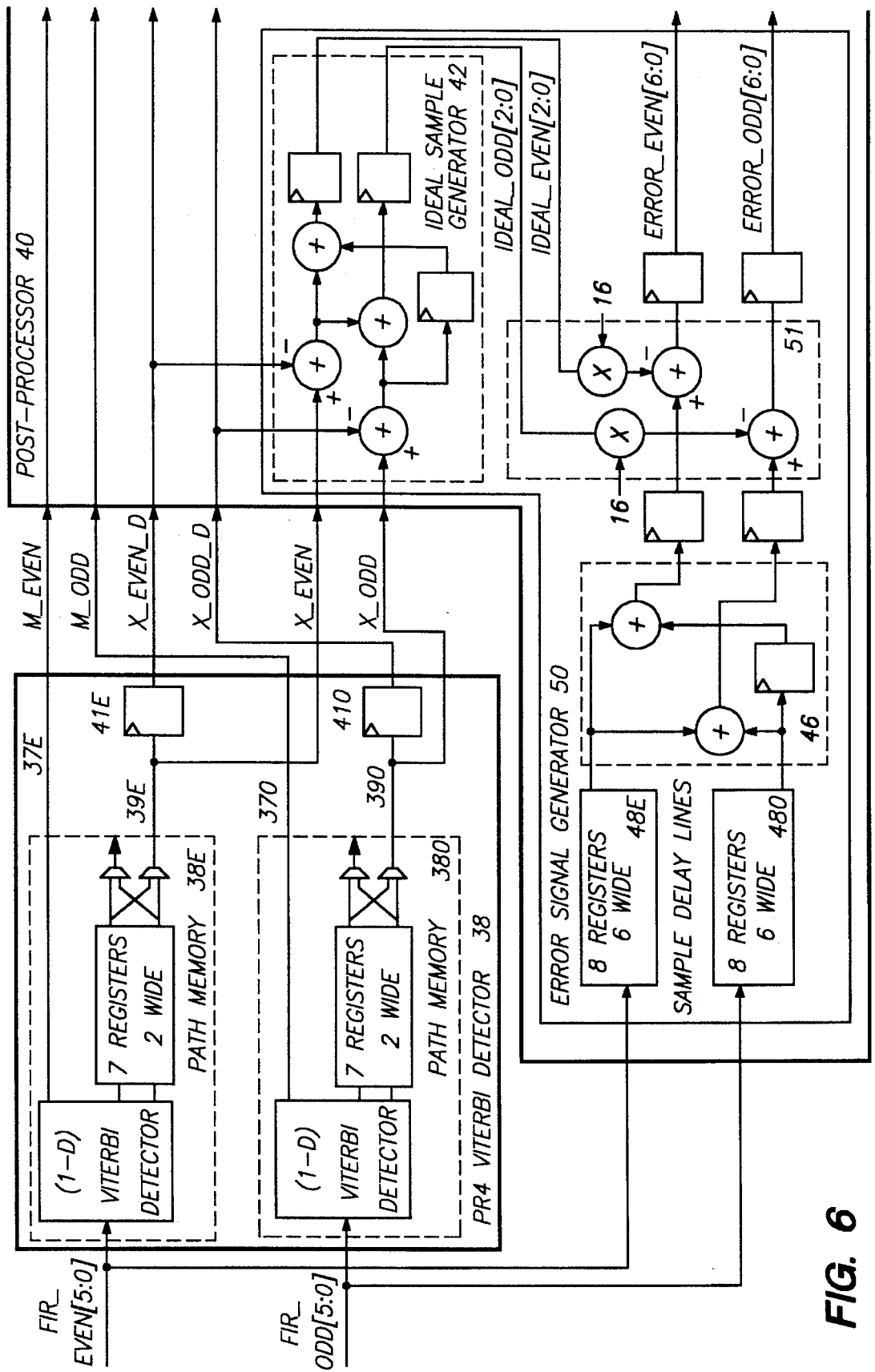
FIG. 6 is a more detailed block diagram of the EPR4 detector in FIG. 5 including the PR4 Viterbi detector and the front-end of the post-processor which contains the error signal generator.

As illustrated in FIG. 6, the PR4 Viterbi detector 38 can be implemented with two interleaved (1–D') Viterbi detectors 38E and 38O, which may be in accordance with commonly assigned U.S. Pat. No. 5,341,387, entitled: "Viterbi Detector Having Adjustable Detection Thresholds for PRML Class IV Sampling Data Detection", the disclosure thereof being incorporated herein by reference. As an example of the signal flow and timing, let the input to the even (1–D') Viterbi detector, FIR_EVEN, correspond to the PR4 equalized sample at time k+20, $r_{PR4}[k+20]$, and the input to the odd (1–D') Viterbi detector, FIR_ODD, correspond to the PR4 equalized sample at time k+21, $r_{PR4}[k+21]$. Each of the (1–D') Viterbi detectors has a path memory from which comes the estimated input symbols associated with the best path through a (1–D') trellis. In the example of FIG. 6, the output of the path memory blocks 39E and 39O correspond to X_EVEN=$\hat{x}[k+4]$ and X_ODD=$\hat{x}[k+5]$, respectively. These signals are delayed in delay elements 41E and 41O to obtain X_EVEN_D=$\hat{x}[k+2]$ and X_ODD_D=$\hat{x}[k+3]$. The signals X_EVEN, X_ODD, X_EVEN_D, and X_ODD_D are then sent from the PR4 Viterbi detector 38 to the post-processor 40. In addition, the (1–D') Viterbi detectors are modified to output the binary merge symbol which indicate the presence or absence of diverging survivor paths in the (1–D') Viterbi detector. Let m[i] respresent the merge symbol associated with the sampled output of the PR4 channel at time i. Then, the merge symbols at the output of the PR4 Viterbi detector 37E and 37O correspond to M_EVEN=m[k+20] and M_ODD=m[k+21], respectively.

During a half-rate clock cycle, each interleaved (1–D') Viterbi detector supplies the post-processor 40 with an estimated binary input symbol and a merge bit. Within a (1–D') Viterbi detector, there are three possible survivor path extensions for one depth of the two-state trellis. The three cases are a divergence from state 0 to states 1 and 0, a divergence from state 1 to states 1 and 0, and parallel paths from state 1 to state 1 and from state 0 to state 0. For the first two cases, the merge bit at the output of the (1–D') Viterbi detector is equal to 1 indicating the presence of a divergence. In the last case, the merge bit is equal to 0 indicating the absence of a divergence.

The merge bits from the PR4 Viterbi detector are used in the post-processor 40 to reduce the number of computations without sacrificing performance. A (1–D') Viterbi detector compares path metrics for the two best paths leading to each state at the current time by extending the survivor paths leading to the two states at the previous time. Since the two survivor paths in a (1–D') Viterbi detector can not cross over each other, the second best path to a particular state is specified by knowing the input symbols associated with the best path and the position where the second best path diverges from the best path. Therefore, the position where the two survivor paths diverge indicates the most-likely starting position of an error-event in the (1–D') trellis.

In order to appreciate the elegant simplicity of the post-processor 40 following the principles of the present invention, it is appropriate to discuss the properties of the two types of minimum distance error-event in the EPR4 trellis of FIG. 4. In the context of the present invention, "type A" minimum distance error-events cause a solid burst of three or more symbol errors in the estimated write current. The "type A" error-events correspond to mistaking an alternating sequence for an alternating sequence with opposite phase, i.e., mistaking a 0101 . . . pattern and a 1010 . . . pattern. The "Type B" error-events cause a solid burst of one or more symbol errors in one interleave of the estimated write current. The "type B" error-events correspond to mistaking a run of 1's in an interleave for a run of 0's, or vice versa, i.e., mistaking a 1×1×1 . . . pattern and a 0×0×0 . . . pattern, where x indicates don't care. Since the minimum distance error-events in the EPR4 trellis of FIG. 4 can have infinite length, a modulation code is used to limit the length of the minimum distance error-events by constraining the run-lengths of zeros on the global and interleaved sequences at the input to the precoder.

The channel 10 illustrated in FIG. 5 makes use of a rate 16/17 (d=0, G-6/I=7) modulation code in accordance with the teaching of copending U.S. patent application Ser. No. 08/497,182, filed on the same day as this patent application and entitled: "A Rate 16/17 (d=0, G=6/I=7) Modulation Code for a Magnetic Recording Channel", the disclosure of which being incorporated herein by reference. For the rate 16/17 (0,6/7) modulation code, the write current following the precoder 18 satisfies the following conditions. There are at most eight consecutive 1's or 0's in the even or odd interleave, i.e., the patterns 1×1×1×1×1×1×1×1×1 and 0×0×

0×0×0×0×0×0 are not allowed. There are at most eight consecutive 1's, 0's, or alternating 0's and 1's in the global sequence, i.e. the patterns 111111111, 000000000, 101010101 and 010101010 are not allowed. In using the rate 16/17 (0,6/7) modulation code a result is that there are 14 possible minimum distance error-events ending at any given state along the trellis. There are six "type A" and eight "type B" minimum distance error events with this modulation code.

A "type B" error-event on the eight-state EPR4 trellis corresponds to a minimum distance error-event on one of the two interleaved (1–D') trellises, since the minimum distance error-events on the (1–D') channel correspond to mistaking a run of 1's and a run of 0's. For instance, the "type B" error-event mistaking 0×0 for 1×1 corresponds to an error-event mistaking 00 for 11 on one of the interleaved (1–D') channels. The most-likely error-event on the (1–D') trellis corresponds to selecting the best path over the second best path entering a particular state, when the second best path happens to be the correct path. In other words, if the best path to a particular state in the (1–D') Viterbi detector is the wrong path, then chances are that the second best path is the correct path. The merge bits indicate the position where the second best path diverges from the best path, and the ending state indicates the position where the second best path remerges with the best path. Since there are only two states in the (1–D') channel, the binary estimates along the best path and the beginning and ending positions of the error-event fully specify the second best path. The type B error-event in the EPR4 trellis corresponding to selecting the best path over the second best path in one of the interleaved (1–D') trellises is referred to as the "best type B" error-event.

A "type A" error-event on the eight state EPR4 trellis corresponds to two minimum distance error-events occuring simultaneously of both interleaved (1–D') trellises. The two error-events start within one channel clock cycle of each other, and end within one channel clock cycle of each other. In addition, the binary estimates on the best paths for each interleave are complements of each other over the extent of the error-event. For instance, the "type A" error-event mistaking 01010 for 10101 corresponds to mistaking 000 for 111 on one interleave and 11 for 00 on the other interleave. The error-event in the EPR4 trellis corresponding to selecting the best paths over the second best paths in both interleaved (1–D') trellises, is referred to as the "best type A" error-event. In order for the "best type A" error-event to correspond to a valid "type A" error-event, the second best paths must diverge from the best paths, in the respective (1–D') trellises, within one clock cycle of each other and the binary input estimates on the two best paths over the unmerged regions must be complements of each other.

The set of "type A" error-events ending at a particular state includes one error-event which is not minimum distance. The "type A" error-event corresponding to two consecutive symbol errors with one symbol error in each interleave has a squared Euclidean distance of 6. In the preferred embodiment of this invention, this error-event is not considered. However, this error-event can be easily included with some minor changes to the embodiment. By not including this error-event, the type A error-events are required to satisfy a minimum length requirement. Therefore, the "best type A" error-event must correspond to three or more consecutive symbol errors in order to correspond to a minimum distance error-event.

Using the Turbo PRML approach outlined in the prior art, the post-processor would be required to calculate and compare 14 error-event metrics, when employing the rate 16/17 (0,6/7) modulation code. In the reduced-complexity post-processor described in the present invention, the post-processor calculates and compares two error-event metrics, independent of the modulation code. The post-processor uses the merge bits from the PR4 Viterbi detector to determine the "best type A" error-event and the "best type B" error-event ending at a particular state. In this manner, the post-processor only considers the most-likely error-event of each type, as determined by the PR4 Viterbi detector.

The Turbo PRML approach described in the prior art, when modified to run at half-rate, considers the set of all minimum distance error-events ending at two consecutive states in the trellis. Therefore, the Turbo PRML post-processor would be required to calculate and compare 28 error-event metrics, when employing the rate 16/17 (0,6/7) code. In contrast, the reduced-complexity post-processor 40 described in the present invention is only required to calculate and compare four error-event metrics, independent of the modulation code. The four error-event metrics correspond to the "best type A" and the "best type B" minimum distance error-events ending at two consecutive states.

Figure 7:
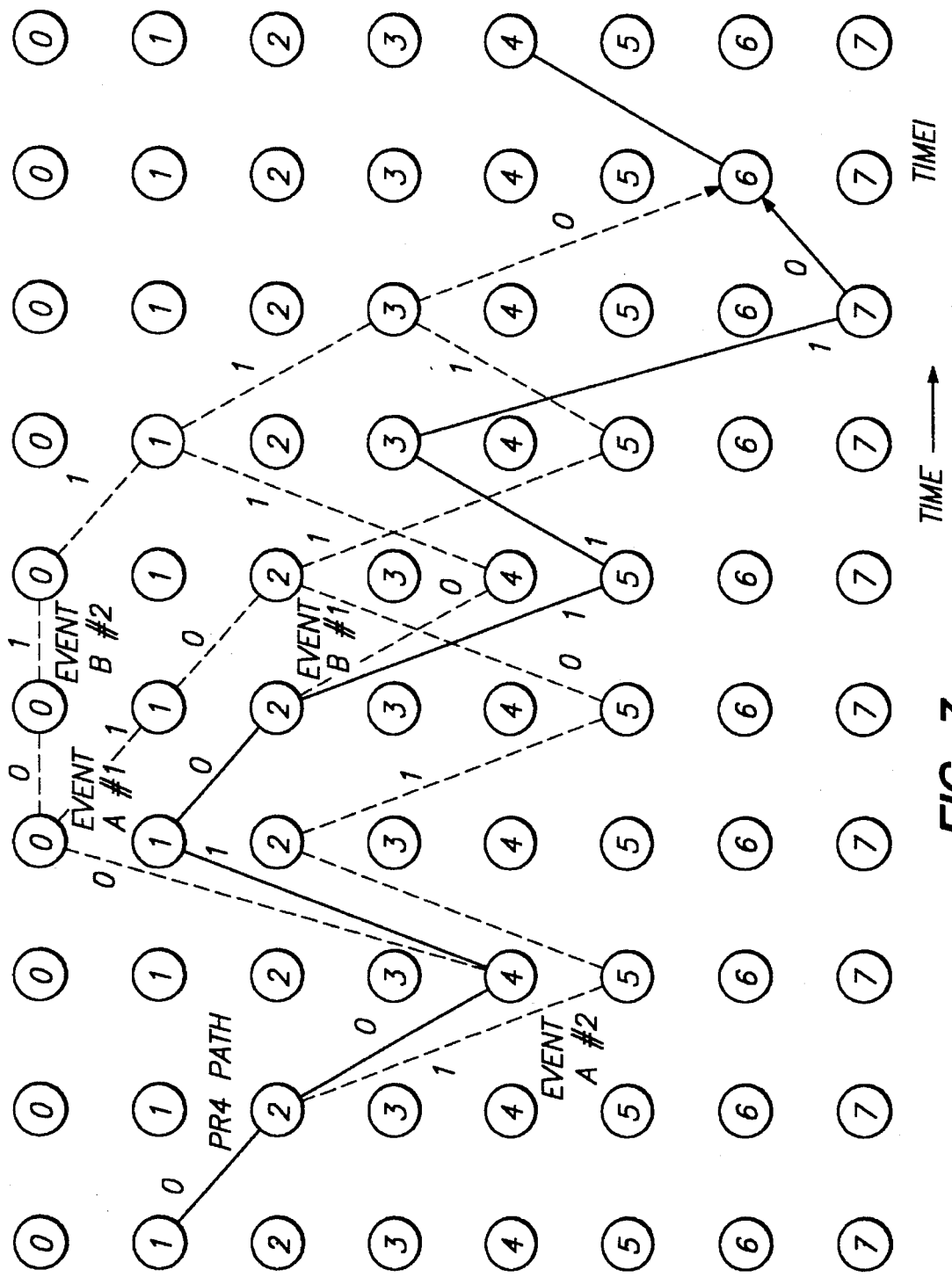
FIG. 7 is a diagram showing the PR4 path through the EPR4 trellis and all possible minimum distance error-events ending at time i along this particular PR4 path.

The post-processor 40 uses the sequence estimate at the output of the PR4 Viterbi detector 38 to specify a path through the eight-state EPR4 trellis, referred to as the PR4 path. In the example of FIG. 7, the PR4 path is depicted with a solid line through the trellis and the branches are labeled with the binary input symbols. The dashed lines in FIG. 7 represent all possible minimum distance error-events ending at time i, given the particular PR4 path depicted in the example. Although the PR4 path in the example has only four possible minimum distance error-events ending at time i, an arbitrary PR4 path can support any number of minimum distance error-events up to the maximum number of minimum distance error-events allowed by the modulation code. Instead of calculating the error-event metrics for all possible minimum distance error-events ending at time k, the post-processor uses the merge bits to determine the "best type A" and the "best type B" minimum distance error-events ending at time k.

In order to describe the post-processing algorithm, we first define some notation. Let L[i] represent the position of the first non-zero merge bit prior to time i in the interleave occupied by symbol i, i.e., the even interleave. Without loss of generality, we let time k represent an even number. Then, L[k] represents the position of the first non-zero merge bit in the even interleave prior to time k, such that L[k] is an even number less than k that satisfies the conditions $m[L[k]]=1$ and $m[L[k]+2n]=0$, for all $1 \leq n \leq (k-2-L[k])/2$. Similarly, L[k+1] represents the position of the first non-zero merge bit in the odd interleave prior to time k+1, such that L[k+1] is an odd number less than k+1 that satisfies the conditions $m[L[k+1]]=1$ and $m[L[k+1]+2p]=0$, for all $1 \leq p \leq (k-1-L[k+1])/2$.

Since the (1–D') trellis has only two states and the survivor paths in the (1–D') Viterbi detector can not cross over each other, the binary input estimates in the even interleave from time L[k] to time k–2 are all equal to each other, such that $\hat{x}[L[k]+2n]=\hat{x}[k-2]$, for $0 \leq n \leq (k-2-L[k])/2$. Similarly, the binary input estimates in the odd interleave from time L[k+1] to time k–1 are all equal to each other, such that $\hat{x}[L[k+1]+2p]=\hat{x}[k-1]$, for $0 \leq p \leq (k-1-L[k+1])/2$.

The starting position of the "best type B" error-event ending at time k is given by L[k–1], and the starting position of the "best type B" error-event ending at time k+1 is given by L[k]. The starting position of the "best type A" error-event ending at time k is given by min{L[k–2], L[k–1]}, and the starting position of the "best type A" error-event ending at time k+1 is given by min{L[k−1], L[k]}. In order for the "best type A" error-event ending at time k to represent a valid type A minimum distance error-event, the following conditions must be satisfied: L[k−1]<k−3, L[k−2]=L[k−1] ±1, and x̂[L[k−2]]≠x̂[L[k−1]]. In order for the "best type A" error-event ending at time k+1 to represent a valid type A minimum distance error-event, the following conditions must be satisfied: L[k]<k−2, L[k−1]=L[k] ±1, and x̂[L[k−1]]≠x̂[L[k]].

The EPR4 error signal at time j, e[j], is defined as the difference between the EPR4 equalized sample, $r_{EPR4}[j]$, and the ideal EPR4 sample, $\hat{y}_{EPR4}[j]=\hat{x}[j]+\hat{x}[j-1]-\hat{x}[j-2]-\hat{x}[j-3]$, such that $e[j]=r_{EPR4}[j]-\hat{y}_{EPR4}[j]$. Assuming that the metric is defined as one-half of the squared Euclidean distance between the received samples and the ideal EPR4 samples, the path metric at time j for the PR4 path through the EPR4 trellis is given by $$\frac{1}{2}\sum_{i=0}^{j}(r_{EPR4}[i]-\hat{y}_{EPR4}[i])^2 = \frac{1}{2}\sum_{i=0}^{j}(e[i])^2.$$

Let the sequences $\{X[0], X[1], \ldots, X[j]\}$ and $\{Y_{EPR4}[0], Y_{EPR4}[1], \ldots, Y_{EPR4}[j]\}$ denote the binary input symbols and the ideal EPR4 samples associated with a contender path that diverges from the PR4 path and remerges for the first time at time j. Then, the difference between the path metrics for the two paths, referred to as the difference metric, is given by $$\frac{1}{2}\sum_{i=0}^{j}(r_{EPR4}[i]-Y[i])^2 - (r_{EPR4}[i]-\hat{y}_{EPR4}[i])^2 =$$

$$\frac{1}{2}\sum_{i=0}^{j}(e[i]-Y[i]+\hat{y}_{EPR4}[i])^2 - (e[i])^2 =$$

$$\left(\frac{1}{2}\sum_{i=0}^{j}(Y[i]-\hat{y}_{EPR4}[i])^2\right) - \sum_{i=0}^{j}e[i](Y[i]-\hat{y}_{EPR4}[i]).$$

Assuming that the contender path differs from the PR4 path by the minimum distance, then the first term in the above equation is equals to one-half of the squared Euclidean distance between the two noiseless EPR4 paths, $d_{min}^2/2$. The second term is a linear combination of the EPR4 error signals, referred to as the error-event metric.

Let emB[j] and dmB[j] represent the error-event metric and the difference metric for the "best type B" error-event ending at time j, respectively, such that $dmB[j]=d_{min}^2/2-emB[j]$. Similarly, let emA[j] and dmA[j] represent the error-event metric and the difference metric for the "best type A" minimum distance error-events ending at time j, respectively, such that $dmA[j]=d_{min}^2/2-emA[j]$. If the type A error-event with squared Euclidean distance 6 is included, the constant in the difference metric equation becomes $d^2/2$ where $d^2$ is equal to 6 if the error-event causes two errors and is equal to 4 otherwise. In the preferred embodiment of the post-processor 40, the "best type A" error-event is restricted to the set of minimum distance error-events, such that $d^2$ is always equal to $d_{min}^2$.

If the difference metric dmB[j] is less than zero, then an EPR4 Viterbi detector would have selected the contender path over the PR4 path at time j. Therefore, the "best type B" error-event ending at time j qualifies as a possible error-event which should be considered for correction. Assuming that the "best type A" error-event ending at time j is valid and the difference metric dmA[j] is less than zero, then the "best type A" error-event ending at time j qualifies as a possible error-event which should be considered for correction.

For the "best type B" error-event ending at time j, the binary input symbols on the two paths are the same prior to time L[j−1], such that X[i]=x̂[i] for all i<L[j−1]. At time L[j−1], the two paths diverge corresponding to X[L[j−1]] ≠x̂[L[j−1]]. Since x̂[L[j−1]+2q]=X̂[j−3] and X[L[j−1]+2q]= X[j−3], for 0≤q≤(j−3−L[j−1])/2, it can be shown that the error-event metric for the "best type B" error-event ending at time j is given by emB[j]=(−1)$^{\hat{x}[j-3]}$(−e[j]−e[j−1]+e[L[j−1]+1]+e[L[j−1]]).

In a similar manner, it can be shown that the error-event metric for the "best type A" error-event ending at time j is given by emA[j]=(−1)$^{\hat{x}[j-3]}$(−e[j]+e[j−2]−e[L[j−1]+2]+e[L[j−1]]), if L[j−2]>L[j−1], and by emA[j]=(−1)$^{\hat{x}[j-3]}$(−e[j]+e[j−2]+e[L[j−2]+2]−e[L[j−2]]), if L[j−2]>L[j−1].

The error-event metric for the "best type B" error-event, emB[j], always corresponds to a valid type B error-event. However, the error-event metric emA[j] is only valid if the "best type A" error-event is valid.

One way of calculating the error-event metrics involves passing the EPR4 error signal e[j] through (1+D) and (1−D²) filters to obtain the (e[j]+e[j−1]) and (e[j]−e[j−2]) terms. The output of the filters is sent to mux input controlled delay element with feedback that contains the terms (e[L[j−1]+1] +e[L[j−1]]) and (e[L[j−1]+2]−e[L[j−1]]). The error-event metrics are obtained, to within a sign change, by adding or subtracting the output of the delay elements from the output of the filters. An alternative method of calculating the error-event metrics is described by Knudson, "Detection and Error-Correction for Partial Response Channels," Ph. D. dissertation, University of California, San Diego, April 1994, pp. 122–141. The disclosure thereof being incorporated herein by reference.

In the preferred embodiment of the post-processor 40, the error-event metrics for the "best type A" and the "best type B" error-events ending at times k and k+1 are calculated during one half-rate clock cycle as follows:

$emB[k] = (-1)^{\hat{x}[k-3]}(- (e[k] +$ $e[k-1]) + (e[L[k-1]+1] + e[L[k-1]]))$ $1emB[k+1] = (-1)^{\hat{x}[k-2]}(-(e[k+1] +$ $e[k]) + (e[L[k]+1] + e[L[k]]))$ $emA[k] = (-1)^{\hat{x}[k-3]}(-(e[k] -$ $e[k-2]) - (e[L[k-1]+2] - e[L[k-1]])),$
if $L[k-2] > L[k-1]$, $(-1)^{\hat{x}[k-3]}(-(e[k] -$
$e[k-2]) + (e[L[k-2]+2] - e[L[k-2]])),$ if $L[k-2] < L[k-1]$, $1emA[k+1] = (-1)^{\hat{x}[k-3]}((e[k+1] -$ $e[k-1]) + (e[L[k]+2] - e[L[k]])),$
if $L[k-1] > L[k]$, $(-1)^{\hat{x}[k-3]}((e[k+1] -$
$e[k-1]) - (e[L[k-1]+2] - e[L[k-1]])),$
if $L[k-1] < L[k]$, since $(-1)^{\hat{x}[k-2]} =$ $-(-1)^{\hat{x}[k-3]}$ for a type A error-event ending at time $k+1$.

The preferred embodiment operates with a single clock running at one half of the channel rate and is designed to achieve very high data rates through extensive pipelining. The output of the FIR filter is clocked with a single half-rate clock, such that the samples $r_{PR4}[k]$ and $r_{PR4}[k+1]$ are output at the same time. This embodiment requires only one addition or comparison operation per half-rate clock cycle. By removing the appropriate pipestages, this embodiment can be easily modified to have any number of operations per half-rate clock cycle with various amounts of cost savings.

Figure 8:
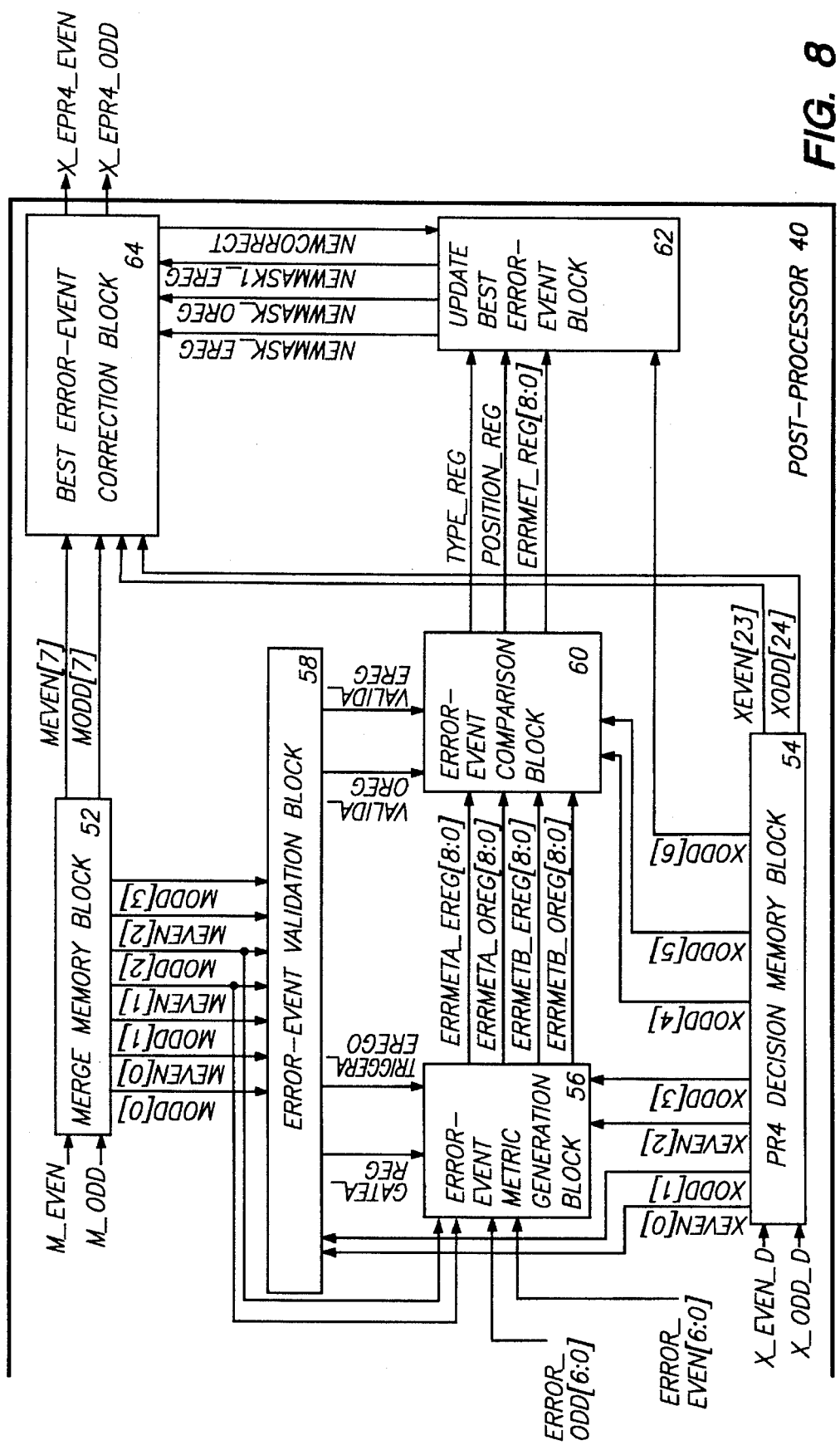
FIG. 8 is a more detailed block diagram of the EPR4 detector in FIG. 5 including the back-end of the EPR4 post-processor, which illustrates everything but the error signal generator shown in FIG. 6.

As shown in FIGS. 6 and 8, a preferred embodiment of the post-processor 40 in accordance with the principles of the present invention is composed of seven main blocks:

the error signal generator block 50 the merge memory block 52 the PR4 decision memory block 54 the error-event metric generation block 56 the error-event validation block 58 the error-event comparison block 60 the update best error-event block 62 the best error-event correction block 64.

The error signal generator block 50 is used to calculate the EPR4 error signals given the PR4 equalized samples and the estimated input sequence at the output of the PR4 Viterbi detector. As shown in FIG. 6, the error signal generator 50 contains two sample delay lines 48E and 48O, a (1+D) filters 46, and an ideal sample generator 42. The sample delay lines 48E and 48O are used to align the PR4 equalized samples with the estimated write current at the output of the PR4 Viterbi detector. The purpose of the (1+D) filter 46 is to complete the equalization of the incoming samples from a PR4 spectrum to an EPR4 spectrum. The samples coming from the FIR filter 30 have been equalized to a PR4 spectrum for the benefit of the timing control loop 32, the gain control loop 34 and the PR4 Viterbi detector 38. Thus, the (1+D) filter 46 is necessary to complete the equalization for the EPR4 post-processor 36. In the ideal sample generator 50, the estimated input sequence at the output of the PR4 Viterbi detector is passed through a $(1+D-D^2-D^3)$ filter to calculate the EPR4 channel output symbols, corresponding to IDEAL_EVEN=$\hat{y}_{EPR4}[k+2]$ and IDEAL_ODD=$\hat{y}_{EPR4}[k+3]$. In FIG. 6, the PR4 equalized samples FIR_EVEN and FIR_ODD are represented with 6 bits, with values ranging from −32 to 31. Assuming that the ideal PR4 samples are −16, 0, and 16 and that the ideal EPR4 samples are −32, −16, 0, 16, and 32, the EPR4 channel output symbols in the set {−2, −1, 0, 1, 2} are multiplied by 16, corresponding to 4 shifts to the left, to obtain the ideal EPR4 sample values. The EPR4 error signals are calculated by subtracting the ideal EPR4 samples from the EPR4 equalized samples, as shown in 51. The EPR4 error signals, corresponding to ERROR_EVEN=e[k] and ERROR_ODD=e[k+1], are passed along to the error-event metric generation block 56.

An alternative method of calculating the EPR4 error signals involves first calculating the PR4 error signals by subtracting the ideal PR4 samples from the PR4 equalized samples. Then, the PR4 error signals are passed through a (1+D) filter to obtain the EPR4 error signals.

Figure 9:
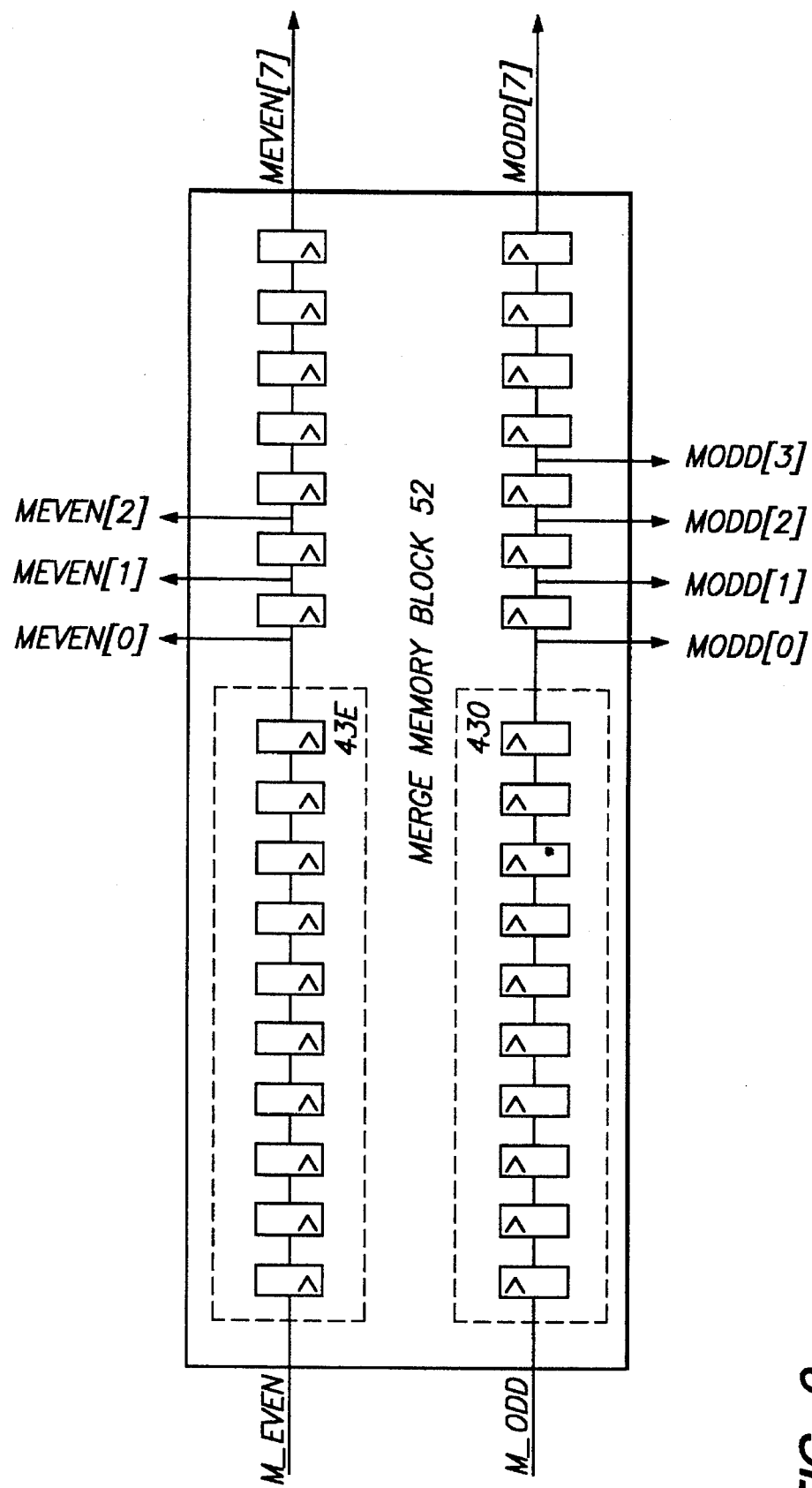
FIG. 9 is a schematic of a merge memory block included in FIG. 8.

FIG. 9 illustrates the merge memory block 52. Since the merge bits at the output of the two (1−D') Viterbi detectors, corresponding to M_EVEN=m[k+20] and M_ODD=m[k+21], are available 10 half-rate clock cylces early, the merge bits are delayed in two delay lines 43E and 43O inside the merge memory. The output of delay lines 43E and 43O, m[k] and m[k+1], is passed on to two tapped delay lines. The taps make the merge bits at various positions in each delay line accessible to the other blocks in the post-processor. In FIGS. 8 and 9, the signal MEVEN[i] corresponds to m[k−2i] and the signal MODD[i] corresponds to m[k+1−2i], for all values of i.

Figure 10:
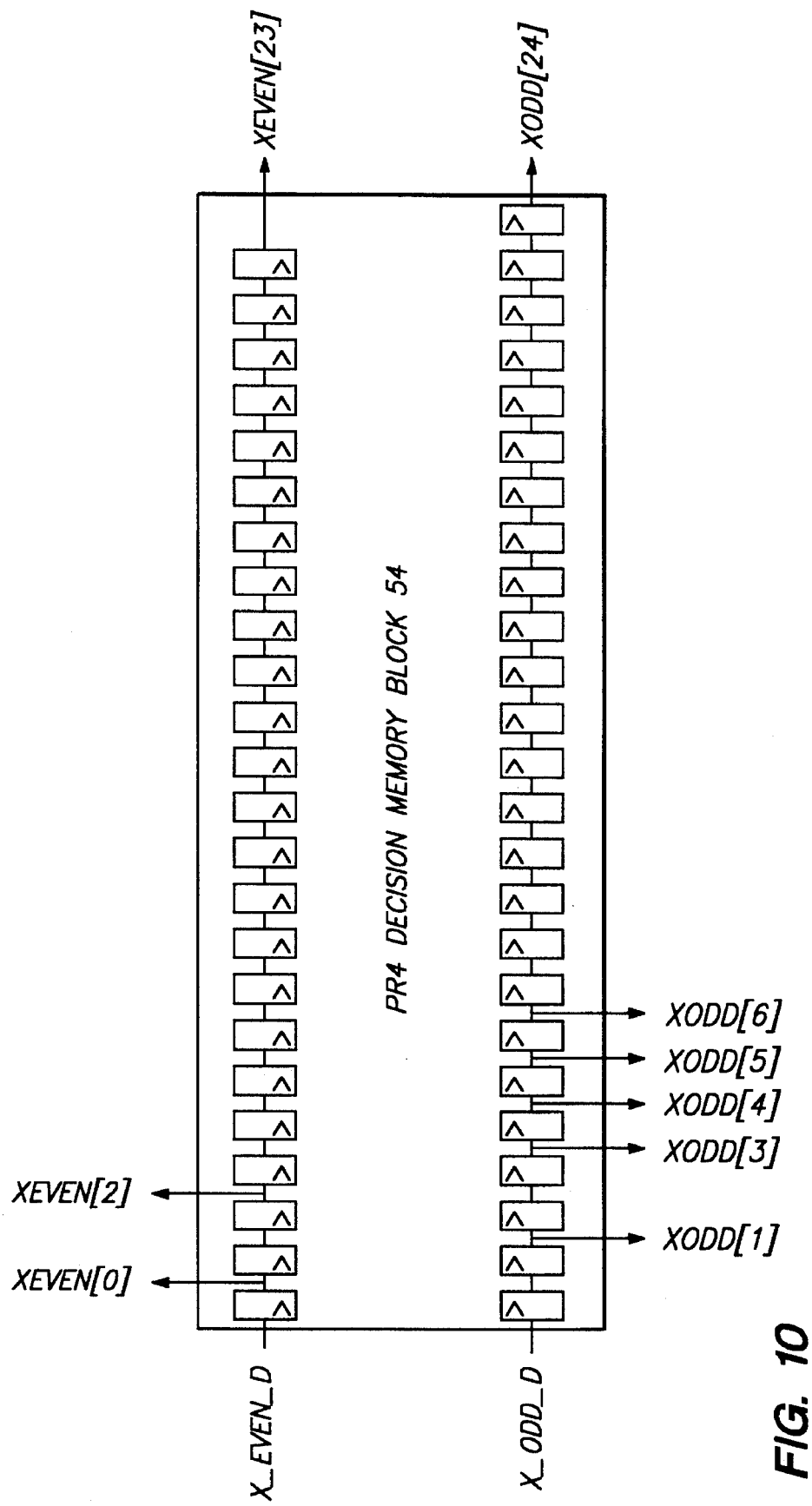
FIG. 10 is a schematic of a PR4 decision memory block included in FIG. 8.

Turning now to FIG. 10, the PR4 decision memory block 54 stores the estimated input symbols from the two (1−D') Viterbi detectors in two tapped delay lines 54E and 54O. The input to the delay lines corresponds to $\hat{x}[k+2]$ and $\hat{x}[k+3]$ and the output of the delay lines corresponds to $\hat{x}[k-46]$ and $\hat{x}[k-47]$. The taps make the PR4 decisions at various positions in each delay line accessible to the other blocks in post-processor. In FIGS. 8 and 10, the signal XEVEN[i] corresponds to $\hat{x}[k-2i]$ and the signal XODD[i] corresponds to $\hat{x}[k+1-2i]$. Error-events in the estimated input sequence ($\hat{x}$) are corrected by passing the output of the delay lines through the best error-event correction block 64 to obtain an improved estimate input sequence ($\overset{\wedge}{\hat{x}}$).

Figure 11:
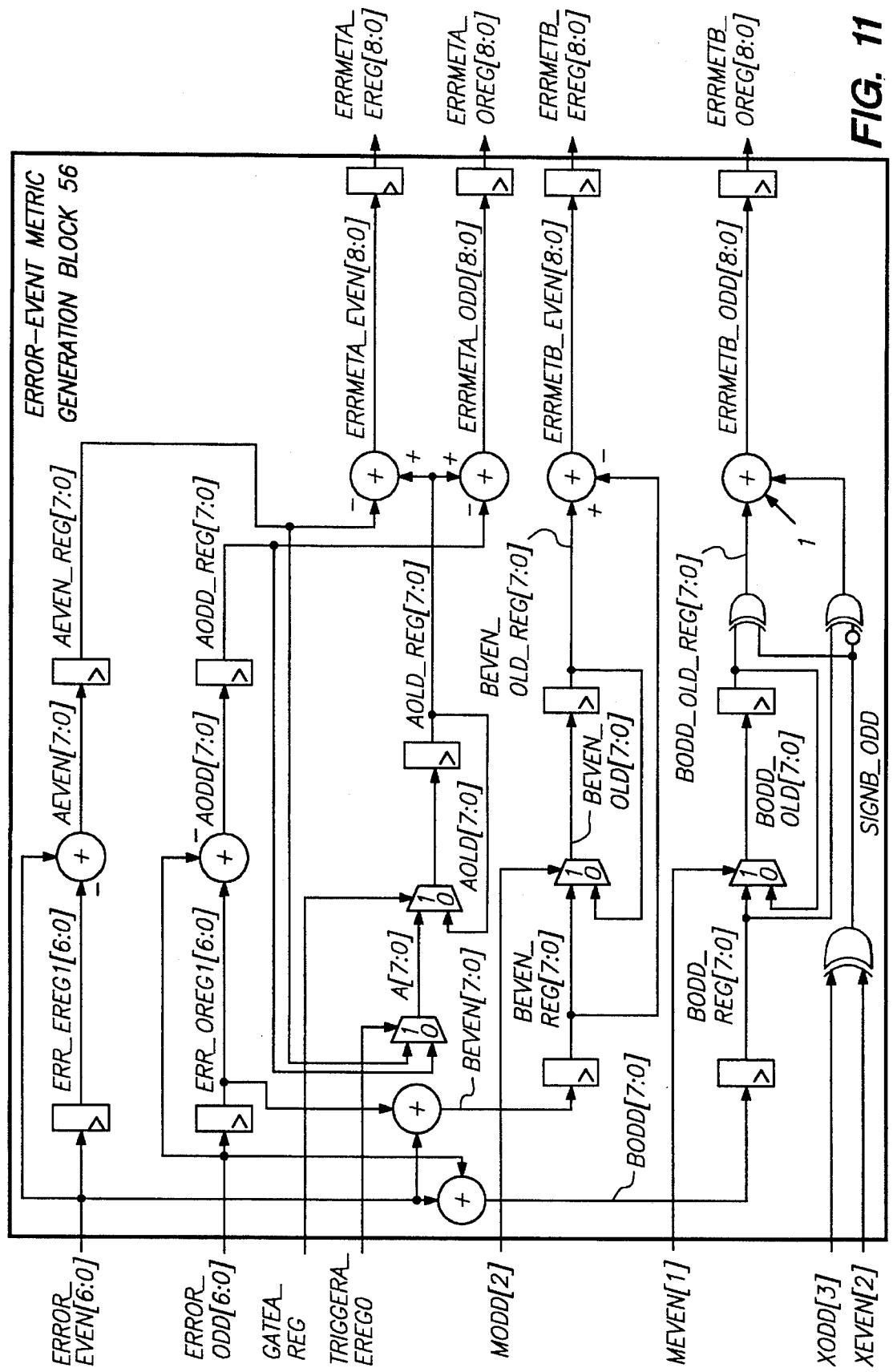
FIG. 11 is a schematic of an error-event metric generation block included in FIG. 8.

Referring now to FIG. 11, the error-event metric generation block 56 receives odd and even EPR4 error signals from the error signal generator 50, where ERROR_EVEN=e[k] and ERROR_ODD=e[k+1]. The EPR4 error signals are sent through (1+D) filters and are delayed to obtain BEVEN_REG=e[k−2]+e[k−3] and BODD_REG=e[k−1]+e[k−2]. Simultaneously, the EPR4 error signals are sent through $(1-D^2)$ filters and are delayed to obtain AEVEN_REG=e[k−2]−e[k−4] and AODD_REG=−(e[k−1]−e[k−3]). The TRIGGERA_EREG0 and GATEA signals generated in the error-event validation block 58 are used to control the input to the a register containing AOLD_REG which is the last value of either AEVEN_REG or AODD_REG associated with the beginning of a type A error-event. The GATEA signal indicates that a type A error-event starts at either time k−3 or k−4. The TRIGGERA_EREG signal indicates that a type A error-event starts in the even interleave at time k−4. The register BEVEN_OLD_REG is the last value of BEVEN_REG associated with the beginning of a type B error-event in the odd interleave. Similarly, the register BODD_OLD_REG is the last value of BODD_REG associated with the beginning of a type B error-event in the even interleave. As used herein the references to odd and even in the names of signals usually pertain to the ending position of an error-event rather than its starting position. The merge bits MEVEN[1]=m[k−2] and MODD[2]=m[k−3] are used to indicate the beginning of a type B error-event in the even interleave at time k−2 and in the odd interleave at time k−3, respectively. The registered values are then added or subtracted to obtain

ERRMETA_EVEN=AOLD_REG−AEVEN_REG

ERRMETA_ODD=AOLD_REG−AODD_REG

ERRMETB_EVEN=BEVEN_OLD_REG−BEVEN_REG

ERRMETB_ODD=$(-1)^{\hat{x}[k-5]} \oplus \hat{x}[k-4]$ (BODD_OLD_REG−BODD_REG).

These signals are registered to obtain the error-event metrics for the "best type A" error-events ending at times k−4 and k−3 and for the "best type B" error-events ending at times k−4 and k−3, such that ERRMETA_EREG=$(-1)^{\hat{x}[k-7]}$emA[k−4]

ERRMETA_OREG=$(-1)^{\hat{x}[k-7]}$emA[k−3]

ERRMETB_EREG=$(-1)^{\hat{x}[k-7]}$emB[k−4]

ERRMETB_OREG=$(-1)^{\hat{x}[k-7]}$emB[k−3].

Figure 12:
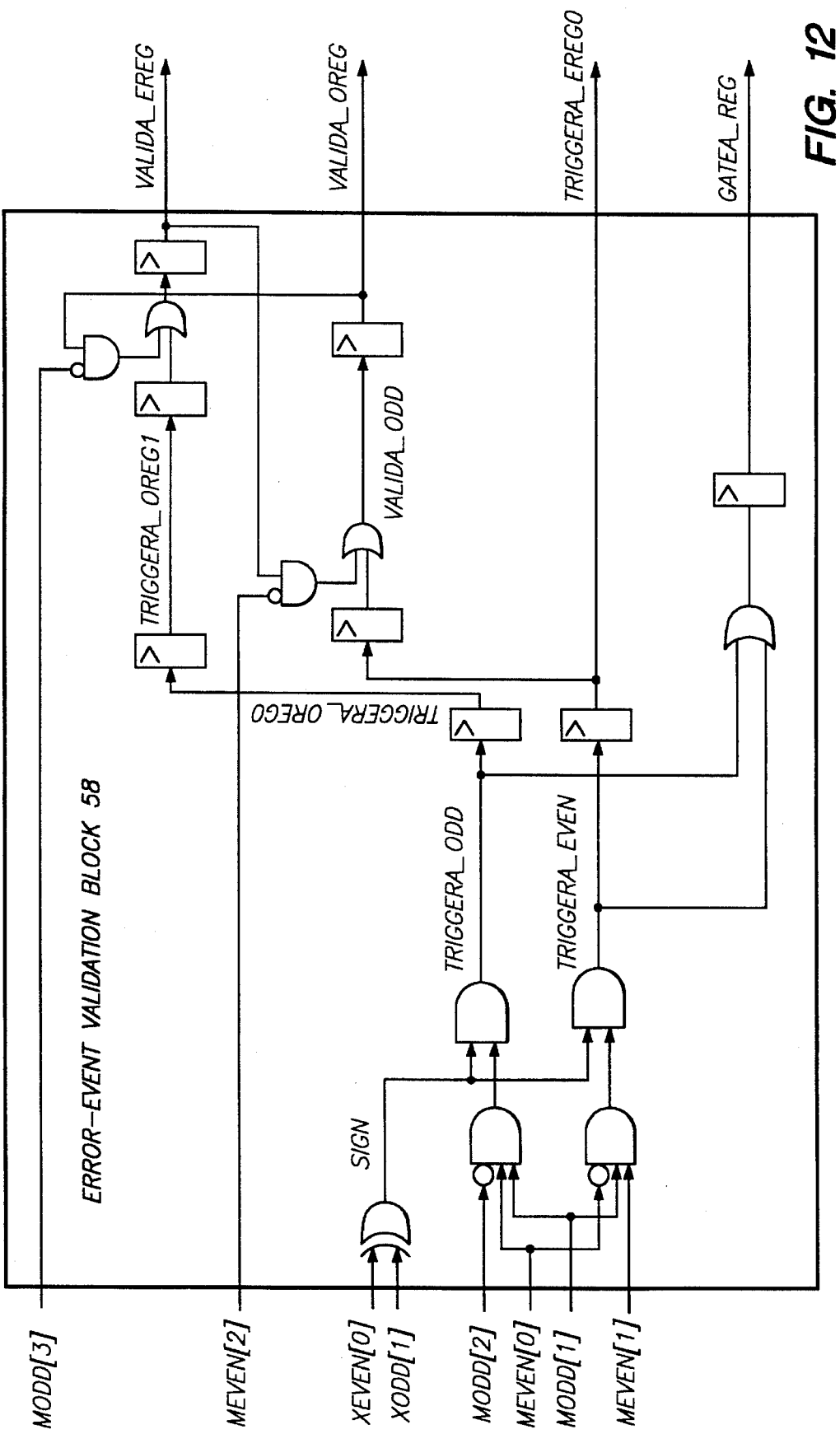
FIG. 12 is a schematic of an error-event validation block included in FIG. 8.

Referring now to FIG. 12, the error-event validation block 58 determines whether or not the "best type A" error-events ending at times k−5 and k−4 are valid. The "best type A" error-event ending at time k−4 is valid if L[k−5]<k−7, L[k−6]=L[k−5]±1, and $\hat{x}[k-8] \neq \hat{x}[k-7]$. Similarly, "best type A" error-event ending at time k−3 is valid if L[k−4]<k−6, L[k−5]=L[k−4]±1, and x̂[k−8]≠x̂[k−7]. If the "best type A" error-event was valid in the previous channel clock cycle and the value of a particular merge bit is zero, then the error-event metric remains valid. The signals VALIDA_EREG and VALIDA_OREG indicate whether or not the "best type A" error-events ending at times k−4 and k−3 are valid, respectively.

In a full channel rate implementation, the error-event comparison block is used to determine the "best type A or B" minimum distance error-event ending at time j that qualifies as a possible error-event for correction. The error-event comparison block compares either the two error-event metrics or the two difference metrics to determine em[j]=max{emA[j], emB[j]} dm[j]=min{dmA[j], dmB[j]}=$d_{min}^2$/2−em[j].

If the "best type A" error-event is valid and dmA[j] or dmB[j] is less than zero, then the post-processor selects one of the two error-events as an error-event to consider for correction. This error-event is flagged and it's difference metric is given by dm[j]=min{dmA[j], dmB[j]}. The post-processor selects the "best type B" error-event ending at time j if dmB[j]<0 and either the "best type A" error-event is invalid or dmB[j]<dmA[j]. In this case, the difference metric dm[j] is set equal to dmB[j]. The post-processor selects the "best type A" error-event ending at time j if dmA[j]<0, dmA[j]<dmB[j], and the "best type A" error-event is valid. In this case, the difference metric for the "best type A or B" error-event ending at time j, dm[j], is set equal to dmA[j].

In a full channel rate implementation, the update best error-event block compares the difference metric of the "best type A or B" error-event ending at time j, dm[j], to the difference metric of the best error-event over a window of time, where the length of the window is equal to the length of the longest error-event. For the rate 16/17 (0,6/7) modulation code, the window has length 18. Let bm[j−18, j−1] represent the difference metric of the best error-event in the window from time j−18 to time j−1. If there is a qualified error-event ending at time j and either there is no qualified error-event in the window from time j−17 to j−1 or dm[j]<bin[j−18, j−1], then the best error-event in the window is updated and bm[j−17, j] is set equal to dm[j]. Otherwise, the best error-event in the window is not updated and bm[j−17, j] is set equal to bm[j−18, j−1]. If the best error-event in the window ends at time j−18, then the best error-event in the window is corrected in the best error-event correction block.

In a half-rate implementation, which is the preferred embodiment, the error-event comparison block 60 determines the "best type A or B" error-event ending at time k or k+1 that qualifies as a possible error-event for correction. In a manner similar to the full-rate implementation, the four error-events ending at times k and k+1 are compared and qualified. If one of the error-events qualifies, then the best error-event is flagged and the difference metric for the "best type A or B" error-event ending at either time k or time k+1, min{dm[k], dm[k+1]}, is set equal to the difference metric corresponding to that error-.event. If an error-event ending at either time k or k+1 was flagged, then the update best error-event block 62 compares the difference metric of the "best type A or B" error-event ending at either time k or time k+1, min{dm[k], dm[k+1]}, to the difference metric of the best error-event over a window of time, where the length of the window is equal to the length of the longest error-event starting at one of two possible consecutive positions. For the rate 16/17 (0,6/7) modulation code, the window has length 19. To simplify the logic, the window length can be extended to 20. Let bm[k−20, k−1] represent the difference metric of the best error-event in the window. If there is a qualified error-event ending at time k or k+1 and either there is no qualified error-event in the window from time k−20 to k−1 or min{dm[k], dm[k+1]}<bm[k−20, k−1], then the best error-event in the window is updated and bm[k−18, k+1] is set equal to min{dm[k], dm[k+1]}. Otherwise, the best error-event in the window is not updated and bm[k−18, k+1] is set equal to bm[k−20, k−1]. If the best error-event in the window ends at time k−20 or k−19, then the best error-event in the window is corrected in the best error-event correction block 64.

Figure 13:
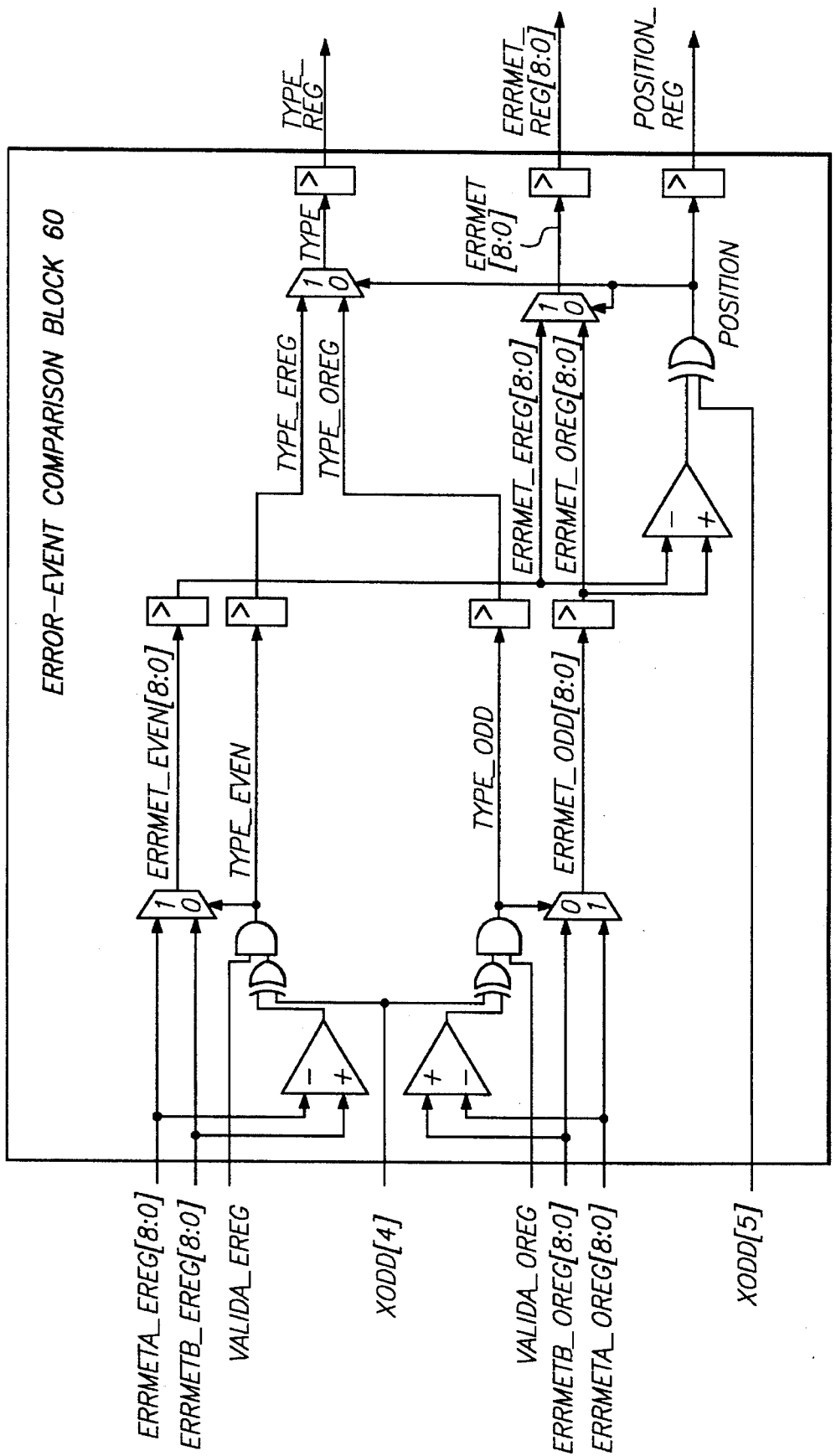
FIG. 13 is a schematic of an error-event comparison block included in FIG. 8.

Referring now to FIG. 13, the error-event comparison block 60 compares the four error-event metrics. The error-event metrics emA[k−4] and emB[k−4] are compared to determine the "best type A or B" error-event metric ending at time k−4, referred to as em[k−4]. If emB[k−4] is larger than emA[k−4] or the type A error-event is invalid, then the type B error-event is selected and em[k−4]=emB[k−4]. Otherwise, the type A error-event is selected and em[k−4]=emA[k−4]. Similarly, the error-event metrics emA[k−3] and emB[k−3] are compared to determine the "best type A or B" error-event ending at time k−3, referred to as em[k−3]. If emB[k−3] is larger than emA[k−3] or the type A error-event is invalid, then then the type B error-event is selected and em[k−3]=emB[k−3]. Otherwise, the type A error-event is selected and em[k−3]=emA[k−3]. In addition, the error-event comparison block compares em[k−6] and em[k−5] to determine the "best type A or B" error-event ending at time k−6 or time k−5. If em[k−6] is larger than em[k−5], then the "best type A or B" error-event ending at time k−6 is selected. Otherwise, the "best type A or B" error-event ending at time k−5 is selected. The register ERRMET_REG represents the error-event metric associated with the "best type A or B" error-event ending at time k−8 or time k−7, to within a sign change.

Figure 14:
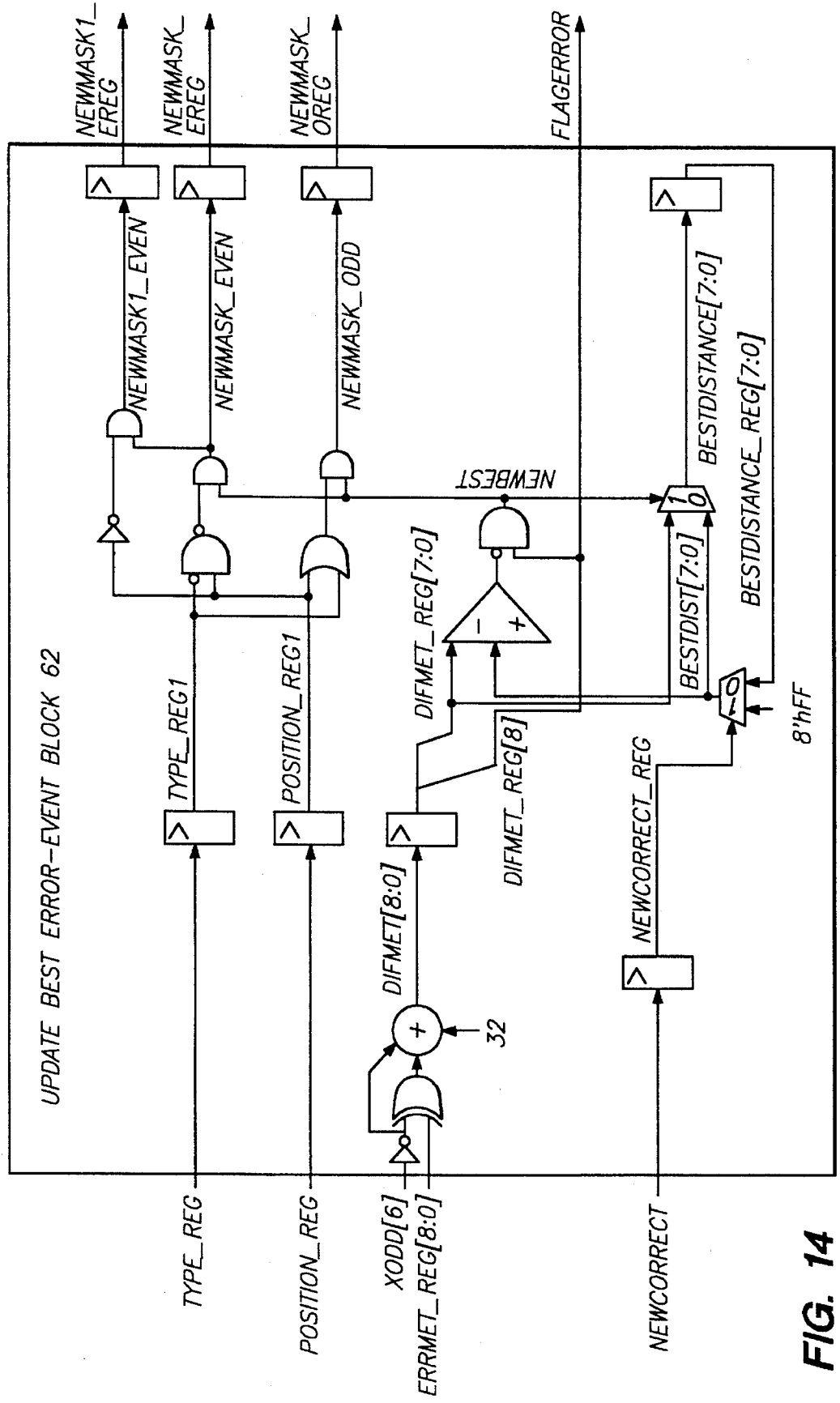
FIG. 14 is a schematic of an update best error-event block included in FIG. 8.

Referring now to FIG. 14, the update best error-event block 62 calculates DIFMET_REG, which is the difference metric associated with the "best type A or B" error-event ending at time k−10 or time k−9, and compares it to the best difference metric over a window of time from k−30 to k−11, corresponding to the signal BESTDIST. If DIFMET_REG is selected over BESTDIST, then the NEWBEST signal goes high signifying that there is a new value for the best difference metric. The NEWMASK_EREG, NEWMASK1_EREG, and NEWMASK_OREG signals are used to place the symbol errors associated with a new best error-event inside the MASK_EVEN and MASK_ODD delay lines inside the best error-event correction block 64. The NEWCORRECT signal generated in the best error-event correction block 64 is used to indicate that the best error-event reached the end of the window; therefore, the best error-event is ready for correction and the window is empty.

Figure 15A:
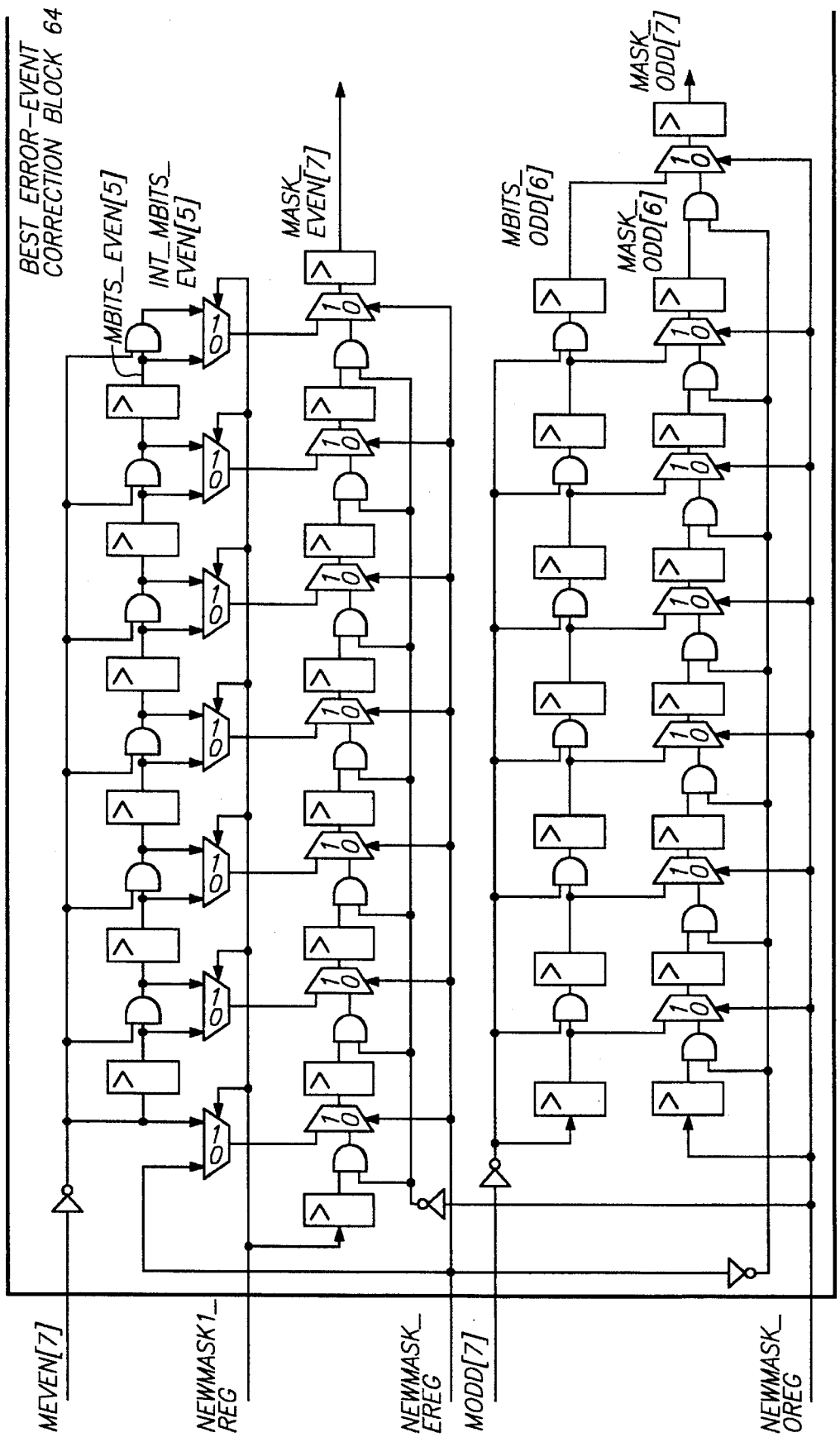
FIG. 15A is the first part of a schematic of a best error-event correction block included in FIG. 8.
Figure 15B:
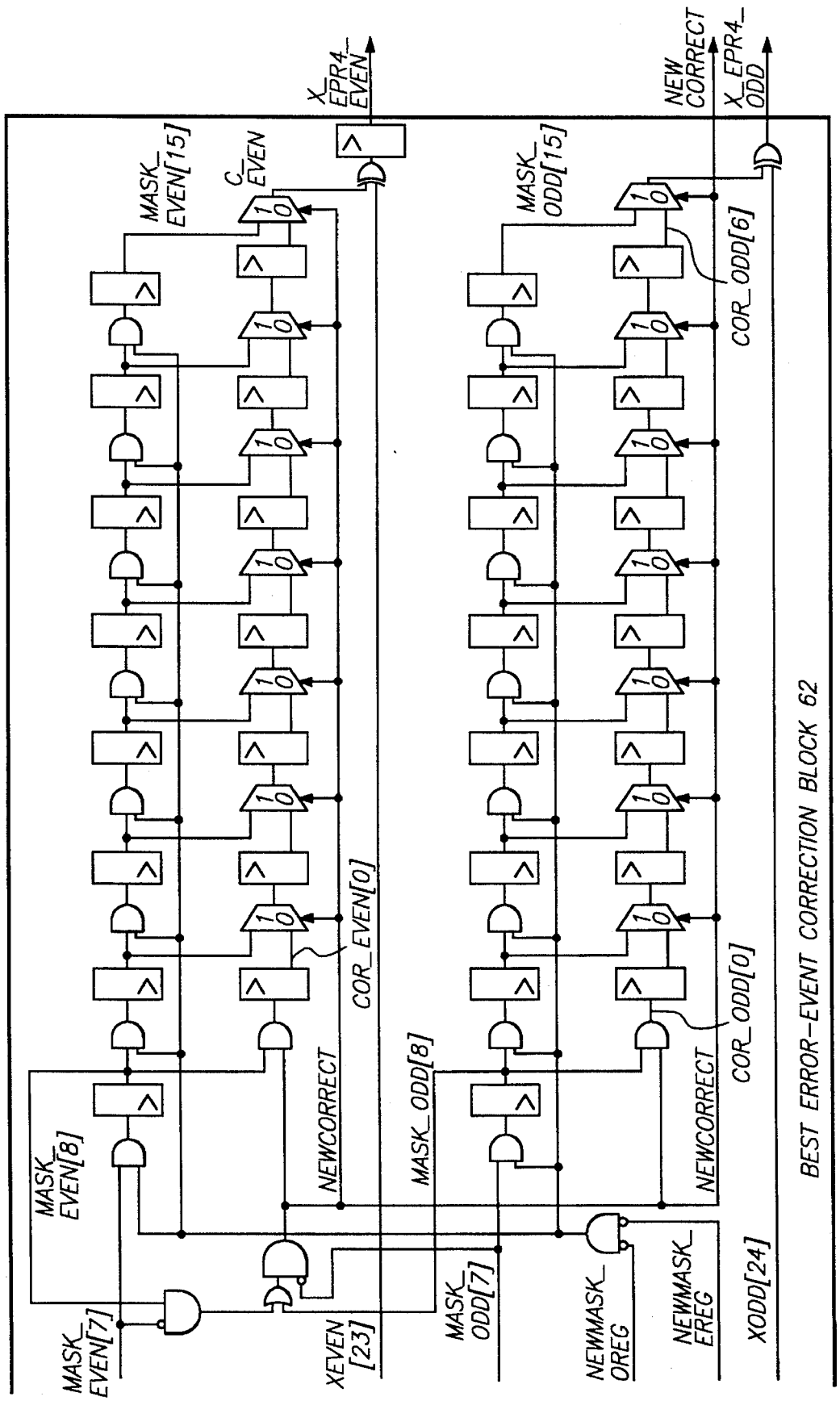
FIG. 15B is the second part of a schematic of the best error-event correction block of FIG. 15A included in FIG. 8.

Referring now to FIGS. 15A and 15B, the best error-event correction block 64 is composed of 6 delay lines. The MASK_EVEN and MASK_ODD delay lines, in FIGS. 15A and 15B, contain the symbol error locations for the best error-event in the window from time k−30 to k−13. The MBITS_EVEN and MBITS_ODD delay lines, in FIG. 15A, contain the symbol error locations, obtained from the merge bits, which feed MASK_EVEN and MASK_ODD, respectively. If the best error-event in the window ends at time k−30 or time k−29, then that error-event is corrected by placing the symbol error locations into the COR_EVEN and COR_ODD delay lines, in FIG. 15B. The output of the COR_EVEN and COR_ODD delay lines is used to flip the erroneous bits at the output of the PR4 decision memory block 54 to obtain an improved estimate of the binary input symbols, where X_EPR4_EVEN=$\hat{x}$[k−48] and X_EPR4_ODD=$\hat{x}$[k−47].

The only dependence on the modulation code constraints for this embodiment of the EPR4 post-processor is in the lengths of the path memories for the (1−D') Viterbi detectors and in the lengths of the delay lines in post-processor.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. An extended partial response, class IV (EPR4) detector within a partial response, class IV (PR4) equalized sampled data detection channel and comprising:

a PR4 Viterbi detector connected to receive digital samples from the PR4 equalized sampled data detection channel for producing an estimated sequence of coded digital information values corresponding to a determined path through a PR4 trellis and for producing other path information relating to other paths through the PR4 trellis, a post-processor connected to the PR4 Viterbi detector and to the PR4 equalized sampled data detection channel and including:

a PR4 path storage circuit for receiving and storing the estimated sequence of coded digital information values which specifies a PR4 path comprising a sequence of states through an EPR4 trellis, an error-event selection circuit for receiving the other path information from the PR4 Viterbi detector for selecting non-overlapping error-events from a set of error-events, and a path correction circuit connected to the PR4 path storage circuit and to the error-events selection circuit for correcting said non-overlapping error-events deviating from the PR4 path through the EPR4 trellis, and for putting out a corrected estimated sequence of coded digital information values.

2. The EPR4 detector set forth in claim 1 wherein the PR4 Viterbi detector is connected to receive odd and even digital samples from the PR4 equalized sampled data detection channel and comprises two bit-wise interleaved (1−D') Viterbi detectors, each said interleaved Viterbi detector putting out an estimated input sequence corresponding to a path through a (1−D') trellis and other path information relating to other paths through the (1−D') trellis.

3. The EPR4 detector set forth in claim 2 wherein each of the (1−D') interleaved Viterbi detectors puts out binary merge symbols indicating one of presence and absence of diverging survivor paths within said each (1−D') interleaved Viterbi detector as said other path information relating to other paths through the (1−D') trellis.

4. The EPR4 detector set forth in claim 3 wherein the error-event selection circuit within the post-processor includes:

a metrics calculation and comparison circuit for calculating and comparing metrics for the set of error-events, a non-overlapping error-events identification circuit responsive to the metrics calculation and comparison circuit for identifying the non-overlapping error events to correct by comparing a calculated metric for an error-event within the set of error-events to a metric for an error-event within the set of error-events and corresponding to a best-error-event observed over a time window.

5. The EPR4 detector set forth in claim 4 wherein the set of error-events for which metrics are calculated by the metrics calculation and comparison circuit comprises one of the following:

from a series of type B minimum distance error-events, a best type B minimum distance error-event ending at each state of the sequence of states along the PR4 path through the EPR4 trellis;

from a series of type B minimum distance error-events, a best type B minimum distance error-event; and, from a series of type A minimum distance error-events, a best type A minimum distance error-event ending at each state of the sequence of states along the PR4 path through the EPR4 trellis; and, from a series of type B minimum distance error-events, a best type B minimum distance error-event; and, from a series of type A error-events, a best type A error-event ending at each state of the sequence of states along the PR4 path through the EPR4 trellis wherein the best type A error-event is not necessarily a minimum distance error-event.

6. The EPR4 detector set forth in claim 5 wherein the estimated sequence of coded digital information values is in accordance with a rate 16/17 (d=0, G=6/I=7) modulation code, and wherein the series of type B minimum distance error-events corresponds to mistaking the following input sequences:

| | |
|---|---|
| 1 | and 0 |
| 1 × 1 | and 0 × 0 |
| 1 × 1 × 1 | and 0 × 0 × 0 |
| 1 × 1 × 1 × 1 | and 0 × 0 × 0 × 0 |
| 1 × 1 × 1 × 1 × 1 | and 0 × 0 × 0 × 0 × 0 |
| 1 × 1 × 1 × 1 × 1 × 1 | and 0 × 0 × 0 × 0 × 0 × 0 |
| 1 × 1 × 1 × 1 × 1 × 1 × 1 | and 0 × 0 × 0 × 0 × 0 × 0 × 0 |
| 1 × 1 × 1 × 1 × 1 × 1 × 1 × 1 | and 0 × 0 × 0 × 0 × 0 × 0 × 0 × 0 | where x indicates a "don't care" state; and wherein the series of type A error-events corresponds to mistaking the following input sequences:

| | |
|---|---|
| 101 | and 010 |
| 1010 | and 0101 |
| 10101 | and 01010 |
| 101010 | and 010101 |
| 1010101 | and 0101010 |
| 10101010 | and 01010101. |

7. The EPR4 detector set forth in claim 3 wherein the PR4 path storage circuit includes:

a merge bits memory connected to receive and delay merge bits from the two bit-wise interleaved (1−D') Viterbi detectors, and a PR4 decision memory connected to receive and delay estimated input symbols from the two bit-wise interleaved (1−D') Viterbi detectors;

wherein the error-event selection circuit includes:

an error-event validation circuit connected to the merge memory and to the PR4 decision memory for validating error-events, an error-event metric generation circuit connected to the merge memory, the PR4 decision memory and to the error-event validation circuit for calculating odd and even interleave error metric signals, and an error-event comparison circuit for comparing the odd and even interleave error metric signals and for determining a current best error-event as identified by the largest error-event metric; and, wherein the path correction circuit includes:

an update best error-event circuit for calculating a current difference metric from the current best error-event and for comparing the current difference metric with a best difference metric within a timing window, and for selecting and saving an updated best error-event difference metric, and a best error-event correction circuit connected to the merge bits memory, the PR4 decision memory and the update best error-event circuit for correcting all symbol errors occurring within an error-event identified by the updated best error-event difference metric, and for putting out corrected symbols as the corrected estimated sequence of coded digital information values.

8. The EPR4 detector set forth in claim 1 wherein the sampled data detection channel includes an encoder and a precoder for encoding incoming digital information values into the sequence of coded digital information values in accordance with a rate 16/17 (d=0, G=6/I=7) modulation code.

9. A digital information storage and retrieval channel including an encoder and a precoder for encoding information values into a sequence of coded digital information values in accordance with a predetermined modulation code, a data write channel for writing the coded digital information values to a magnetic data storage medium, a partial response, class IV (PR4) equalized sampled data detection channel for receiving a signal stream from the magnetic data storage medium and including a PR4 equalizer circuit for equalizing the signal stream to a PR4 spectrum, and a digital sampler for providing synchronous digital samples from the equalized signal stream and further including:

a PR4 Viterbi detector connected to receive the synchronous digital samples for producing an estimated sequence of the coded digital information values and for producing other path information relating to other paths through a PR4 trellis, a post-processor connected to the PR4 Viterbi detector and to the PR4 equalized sampled data detection channel and including:

a PR4 path storage circuit for receiving and storing the estimated sequence of coded digital information values which corresponds to a PR4 path comprising a sequence of states through an extended partial response, class IV (EPR4) trellis, an error-event selection circuit for receiving the other path information from the PR4 Viterbi detector for generating non-overlapping error-events from a set of error-events deviating from the PR4 path through the EPR4 trellis stored in the PR4 path storage circuit, a path correction circuit connected to the PR4 path storage circuit and to the error-event selection circuit for correcting said non-overlapping error-events deviating from the PR4 path through the EPR4 trellis, and for putting out a corrected estimated sequence of coded digital information values.

10. The digital information storage and retrieval channel set forth in claim 9 wherein the PR4 equalized sampled data detection channel further comprises a digital finite impulse response filter connected between the digital sampler and the PR4 viterbi detector, and wherein the post-processor is connected to an output of the digital finite impulse response filter.

11. The digital information storage and retrieval channel set forth in claim 9 wherein the predetermined modulation code comprises a rate 16/17 (d=0, G=6/I=7) modulation code.

12. The digital information storage and retrieval channel set forth in claim 9 further comprising a postcoder and a decoder for decoding the corrected estimated sequence of coded digital information values in accordance with an inverse of the rate 16/17 (d=0, G=6/I=7) modulation code.

13. The digital information storage and retrieval channel set forth in claim 9 wherein the PR4 Viterbi detector is connected to receive odd and even digital samples from the PR4 equalized sampled data detection channel and comprises two bit-wise (1−D') interleaved Viterbi detectors, each said (1−D') interleaved Viterbi detector putting out an estimated input sequence corresponding to a path through a (1−D') trellis and other path information relating to other paths through the (1−D') trellis.

14. The digital information storage and retrieval channel set forth in claim 13 wherein each of the (1−D') interleaved Viterbi detectors puts out binary merge symbols indicating one of presence and absence of diverging survivor paths within each said (1−D') interleaved Viterbi detector as said other path information relating to other paths through the (1−D') trellis.

15. A digital information storage and retrieval channel set forth in claim 14 wherein the error-events selection circuit within the post-processor includes:

a metrics calculation and comparison circuit for calculating and comparing metrics for the set of error-events, a non-overlapping error-events identification circuit responsive to the metrics calculation and comparison circuit for identifying the non-overlapping error events to correct by comparing a calculated metric for an error-event within the set of error-events to a metric for an error-event corresponding to a best-error-event observed over a time window.

16. The digital information storage and retrieval channel set forth in claim 15 wherein the set of error-events for which metrics are calculated by the metrics calculation and comparison circuit comprises one of the following:

from a series of type B minimum distance error-events, a best type B minimum distance error-event ending at each state in a sequence of states along the PR4 path through the EPR4 trellis, from a series of type B minimum distance error-events, a best type-B minimum distance error-event and from a series of type A minimum distance error events, a best type A minimum distance error event ending at each state in the sequence of states along the PR4 path through the EPR4 trellis, and from a series of type B minimum distance error-events, a best type B minimum distance error-event and from a series of type A error events, a best type A error-event ending at each state in the sequence of states along the PR4 path through the EPR4 trellis wherein the best type A error-event is not a minimum distance error-event.

17. The digital information storage and retrieval channel set forth in claim 16 wherein the estimated sequence of coded digital information values is in accordance with a rate 16/17 (d=0, G=6/I=7) modulation code, and wherein the series of type B minimum distance error-events corresponds to mistaking the following input sequences:

| | |
|---|---|
| 1 | and 0 |
| 1 × 1 | and 0 × 0 |
| 1 × 1 × 1 | and 0 × 0 × 0 |
| 1 × 1 × 1 × 1 | and 0 × 0 × 0 × 0 |
| 1 × 1 × 1 × 1 × 1 | and 0 × 0 × 0 × 0 × 0 |
| 1 × 1 × 1 × 1 × 1 × 1 | and 0 × 0 × 0 × 0 × 0 × 0 |
| 1 × 1 × 1 × 1 × 1 × 1 × 1 | and 0 × 0 × 0 × 0 × 0 × 0 × 0 |
| 1 × 1 × 1 × 1 × 1 × 1 × 1 × 1 | and 0 × 0 × 0 × 0 × 0 × 0 × 0 × 0 | where x indicates a "don't care" state; and wherein the series of type A error-events corresponds to mistaking the following input sequences:

| | |
|---|---|
| 101 | and 010 |
| 1010 | and 0101 |
| 10101 | and 01010 |
| 101010 | and 010101 |
| 1010101 | and 0101010 |
| 10101010 | and 01010101. |

18. The digital information storage and retrieval channel set forth in claim 14 wherein the PR4 path storage circuit includes:

a merge bits memory connected to receive and delay merge bits from the two bit-wise interleaved (1–D') Viterbi detectors, and a PR4 decision memory connected to receive and delay write current samples from the two bit-wise interleaved (1–D') Viterbi detectors;

wherein the error-event selection circuit includes:

an error-event validation circuit connected to the merge memory and to the PR4 decision memory for validating error-events, an error-event metric generation circuit connected to the merge memory, the PR4 decision memory and to the error-event validation circuit for calculating odd and even interleave error metric signals, and an error-event comparison circuit for comparing the odd and even interleave error metric signals and for determining a current best error-event as identified by the largest error-event metric; and, wherein the path correction circuit includes:

an update best error-event circuit for calculating a current difference metric from the current best error-event and for comparing the current difference metric with a best difference metric within a timing window, and for selecting and saving an updated best difference metric, and a best error-event correction circuit connected to the merge bits memory, the PR4 decision memory and the update best error-event circuit for correcting all symbol errors occurring within an error-event identified by the updated best error-event difference metric, and for putting out corrected symbols as the corrected estimated sequence of coded digital information values.

19. An extended partial response, class IV (EPR4) detection method within a partial response, class IV (PR4) equalized sampled data detection channel comprising the steps of:

receiving digital samples from the PR4 equalized sampled data detection channel into a PR4 Viterbi detector and producing within the PR4 Viterbi detector an estimated sequence of coded digital information values corresponding to a determined path through a PR4 trellis and other path information relating to other paths through the PR4 trellis, post-processing the estimated sequence of coded digital information values and the other path information within a post-processor connected to the PR4 Viterbi detector and to the PR4 equalized sampled data detection channel in accordance with the further steps of:

receiving and storing the estimated sequence of coded digital information values which corresponds to a PR4 path comprising a sequence of states through an EPR4 trellis within a PR4 path storage circuit, receiving the other path information from the PR4 Viterbi detector and generating non-overlapping error-events from a set of error-events deviating from the PR4 path through the EPR4 trellis stored in the PR4 path storage circuit within an error-event selection circuit, and correcting said non-overlapping error-events deviating from the PR4 path through the EPR4 trellis within a path correction circuit connected to the PR4 path storage circuit and to the error-event selection circuit and putting out a corrected estimated sequence of coded digital information values.

20. The EPR4 detection method set forth in claim 19 comprising the further steps of receiving odd and even digital samples from the PR4 equalized sampled data detection channel into two bit-wise (1–D') interleaved Viterbi detectors and putting out an estimated input sequence corresponding to a path through a (1–D') trellis and other path information relating to other paths through the (1–D') trellis from each bit-wise (1–D') interleaved Viterbi detector.

21. The EPR4 detection method set forth in claim 20 comprising the further steps of putting out from each bit-wise (1–D') interleaved Viterbi detector binary merge symbols indicating one of presence and absence of diverging survivor paths as said other path information relating to other paths through the (1–D') trellis.

22. The EPR4 detection method set forth in claim 21 comprising the further steps of calculating and comparing metrics for the set of error-events within the error-event selection circuit within the post-processor, and identifying the non-overlapping error events to correct by comparing a metric for an error-event within the set of error-events to a metric for an error-event corresponding to a best-error-event observed over a time window within a non-overlapping error-events identification circuit within the post-processor.

23. The EPR4 detection method set forth in claim 22 wherein the set of error-events for which metrics are calculated by the metrics calculation and comparison step comprises the step of determining one of the following:

from a series of type B minimum distance error-events, a best type B minimum distance error-event ending at each state in the sequence of states along the PR4 path through the EPR4 trellis, from a series of type B minimum distance error-events a best type B minimum distance error-event and from a series of type A minimum distance error-events a best type A minimum distance error event ending at each state in the sequence of states along the PR4 path through the EPR4 trellis, and from a series of type B minimum distance error-events a best type B minimum distance error-event and from a series of type A error-events a best type A error-event ending at each state in the sequence of states along the PR4 path through the EPR4 trellis wherein the best type A error-event is not necessarily a minimum distance error-event.

24. The EPR4 detection method set forth in claim 23 wherein the estimated sequence of coded digital information values is in accordance with a rate 16/17 (d=0, G=6/I=7) modulation code, and wherein the step of determining the series of minimum distance type B error-events comprises the step of determining mistaking of the following input sequences:

| | |
|---|---|
| 1 | and 0 |
| 1 × 1 | and 0 × 0 |
| 1 × 1 × 1 | and 0 × 0 × 0 |
| 1 × 1 × 1 × 1 | and 0 × 0 × 0 × 0 |
| 1 × 1 × 1 × 1 × 1 | and 0 × 0 × 0 × 0 × 0 |
| 1 × 1 × 1 × 1 × 1 × 1 | and 0 × 0 × 0 × 0 × 0 × 0 |
| 1 × 1 × 1 × 1 × 1 × 1 × 1 | and 0 × 0 × 0 × 0 × 0 × 0 × 0 |
| 1 × 1 × 1 × 1 × 1 × 1 × 1 × 1 | and 0 × 0 × 0 × 0 × 0 × 0 × 0 × 0 | where x indicates a "don't care" state; and wherein the step of determining the series of type A error-events comprises the step of determining mistaking of the following input sequences:

| | |
|---|---|
| 101 | and 010 |
| 1010 | and 0101 |
| 10101 | and 01010 |
| 101010 | and 010101 |
| 1010101 | and 0101010 |
| 10101010 | and 01010101. |

25. The EPR4 detection method set forth in claim 19 comprising the further step of encoding digital information values coming into the PR4 equalized sampled data detection channel into the sequence of coded digital information values in accordance with a rate 16/17 (d=0, G=6/I=7) modulation code.

26. The EPR4 detection method set forth in claim 25 comprising the further step of decoding the corrected estimated sequence of coded digital information values in accordance with an inverse of the rate 16/17 (d=0, G=6/I=7) modulation code.

* * * * *